United States Patent [19]
Harada et al.

[11] Patent Number: 5,551,021
[45] Date of Patent: Aug. 27, 1996

[54] IMAGE STORING MANAGING APPARATUS AND METHOD FOR RETREIVING AND DISPLAYING MERCHANDISE AND CUSTOMER SPECIFIC SALES INFORMATION

[75] Inventors: Hisayuki Harada; Toshitsugu Tomita, both of Tokyo, Japan

[73] Assignee: Olympus Optical Co., Ltd., Tokyo, Japan

[21] Appl. No.: 279,993

[22] Filed: Jul. 25, 1994

[30] Foreign Application Priority Data

Jul. 30, 1993 [JP] Japan .................................. 5-189817
Feb. 15, 1994 [JP] Japan .................................. 6-018150

[51] Int. Cl.$^6$ .................................................. G06F 17/30
[52] U.S. Cl. ........................................ 395/600; 364/401 R
[58] Field of Search ................................. 395/600, 800, 395/200; 358/342, 350; 364/401, 407

[56] References Cited

U.S. PATENT DOCUMENTS

| | | | |
|---|---|---|---|
| 4,775,935 | 10/1988 | Yourick ................................. | 364/401 |
| 4,905,094 | 2/1990 | Pocock et al. ......................... | 358/342 |
| 5,208,665 | 5/1993 | McCalley et al. ..................... | 358/86 |
| 5,426,594 | 6/1995 | Wright et al. ......................... | 364/514 R |

FOREIGN PATENT DOCUMENTS 0265232  4/1988  European Pat. Off. .
0368475  5/1990  European Pat. Off. .

OTHER PUBLICATIONS

Patent Abstracts of Japan, vol. 17, No. 335 (P-1563), Jun. 24, 1993 & JP-A-50 040 858 (OMRON Corp.) Feb. 19, 1993.

Patent Abstracts of Japan, vol. 11, No. 331 (P-630), Oct. 29, 1987 & JP-A-62 113 267 (Mitsubishi Electric Corp.) May 25, 1987.

*Primary Examiner*—Thomas G. Black
*Assistant Examiner*—Peter Y. Wang
*Attorney, Agent, or Firm*—Frishauf, Holtz, Goodman, Langer & Chick

[57] ABSTRACT

A customer and merchandise image data are picked up by an image generator and are stored in a customer data storage section and a merchandise data storage section in a data storage section together with link data and key data about each customer and each merchandise. Sales data of a merchandise for each customer is stored in a sales data storage section. In accordance with an instruction from an instruction input section, a processor searches the customer data and merchandise data storage sections and displays one of data about a specific customer and data about a specific merchandise with an image on a display, or retrieves data about a specific customer and data about each merchandise purchased by this customer from the customer data and merchandise data storage sections based on the sales data stored in the sales data storage section and displays those data with images on the display in association with each other.

24 Claims, 30 Drawing Sheets

CUSTOMER RETRIEVAL SCREEN   SORT ORDER ITEM NAME :

SORT ORDER ITEMS

CUSTOMER NO.
NAME
DATE OF BIRTH
ADDRESS
TELEPHONE NO.
OFFICE
TELEPHONE NO.
SIZE
FIGURE
FRIENDS
ATTENDANT
DATE OF PREVIOUS
  SHOPPING
SHOPPING FREQUENCY
DATE OF PREVIOUS
  PURCHASE
PURCHASE FREQUENCY
MONEY SPENT FOR
  PURCHASES IN
  THIS YEAR
ROUGH PROFIT
AMOUNT OF PURCHASES
  IN THIS YEAR
MONEY SPENT FOR
  PURCHASES IN
  LAST YEAR
AMOUNT OF PURCHASES
  IN LAST YEAR
CUSTOM-MADE RATIO

小×田×子 29 YEARS SIZE9
DENENCHOFU   03-5××-××××
FOREIGN OFFICE 03-×××-××××
TOMITA

HOME
ADDRESS   TELEPHONE NO.
OFFICE TELEPHONE NO.
PERSON IN CHARGE

INDIVIDUAL CUSTOMER / DRESSING SCREEN

COSTUMER NO.　PHONETIC TRANSCRIPTIONS IN KANA　NAME　DATE OF BIRTH　AGE　ADDRESS　TEL. NO.　OFFICE　TEL. NO.　SIZE　FIGURE　FRIENDS　ATTENDANT　DATE OF PREVIOUS SHOPPING　DATE OF PREVIOUS PURCHASE

ATTENDANT COMMENT　MONEY SPENT FOR PURCHASES IN THIS YEAR　MONEY SPENT FOR PURCHASES IN LAST YEAR　SHOPPING FREQUENCY　CUSTOM-MADE RATIO

AMOUNT OF PURCHASES IN THIS YEAR　AMOUNT OF PURCHASES IN LAST YEAR　PURCHASE FREQUENCY

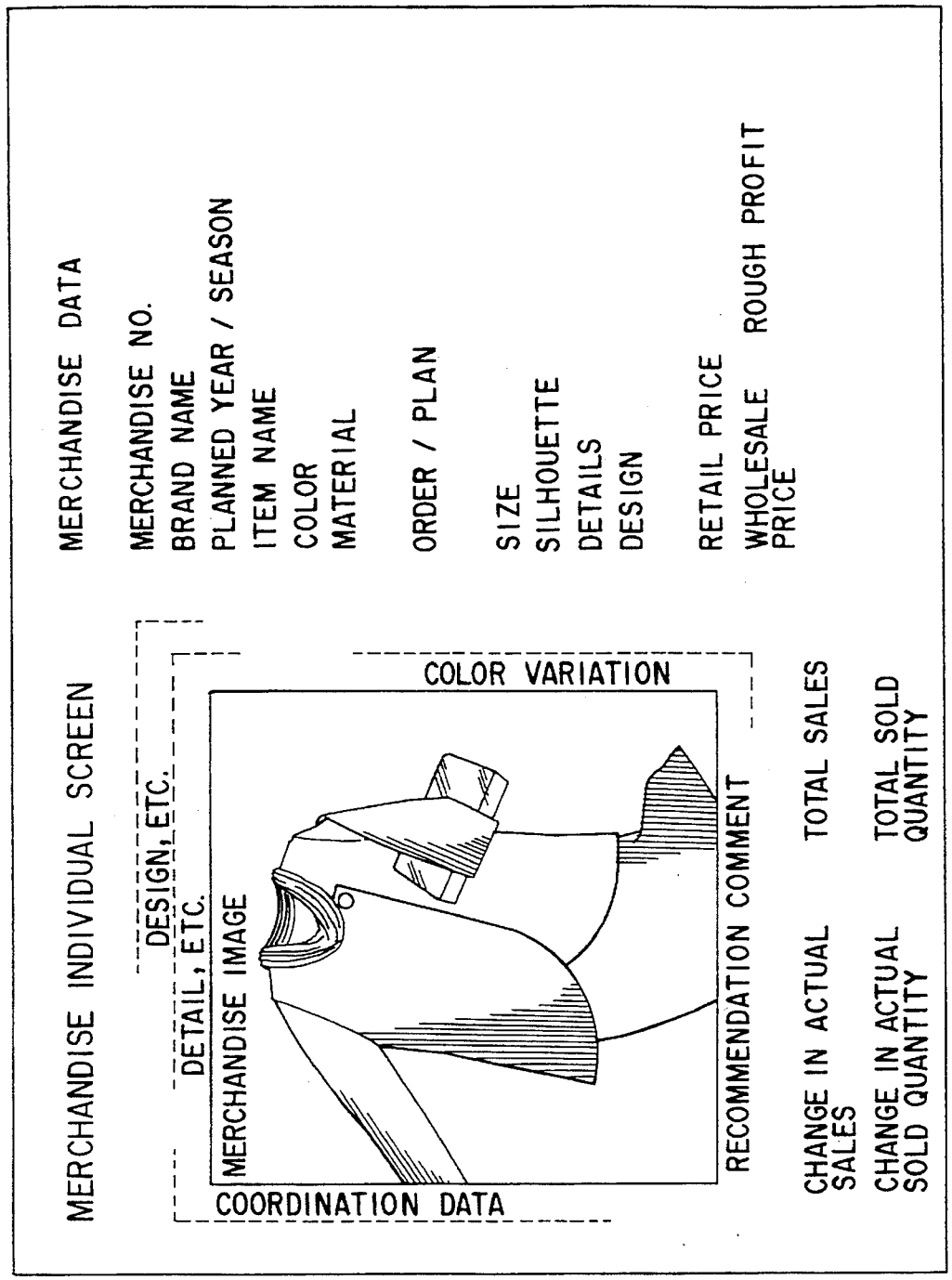
F I G. 11

FIG. 12

MAGAZINE DATA RETRIEVAL SCREEN

SORT ORDER ITEM NAME

SORT ORDER ITEM

DATA NO.

NAME OF MAGAZINE

ISSUED DATE

PAGE

PHOTOGRAPHING DATA

PHOTOGRAPHING PLACE (ACCESSORY NAME)

(DESIGN-PATTERN NAME)

NAME OF MAGAZINE

PAGE

ISSUED DATE

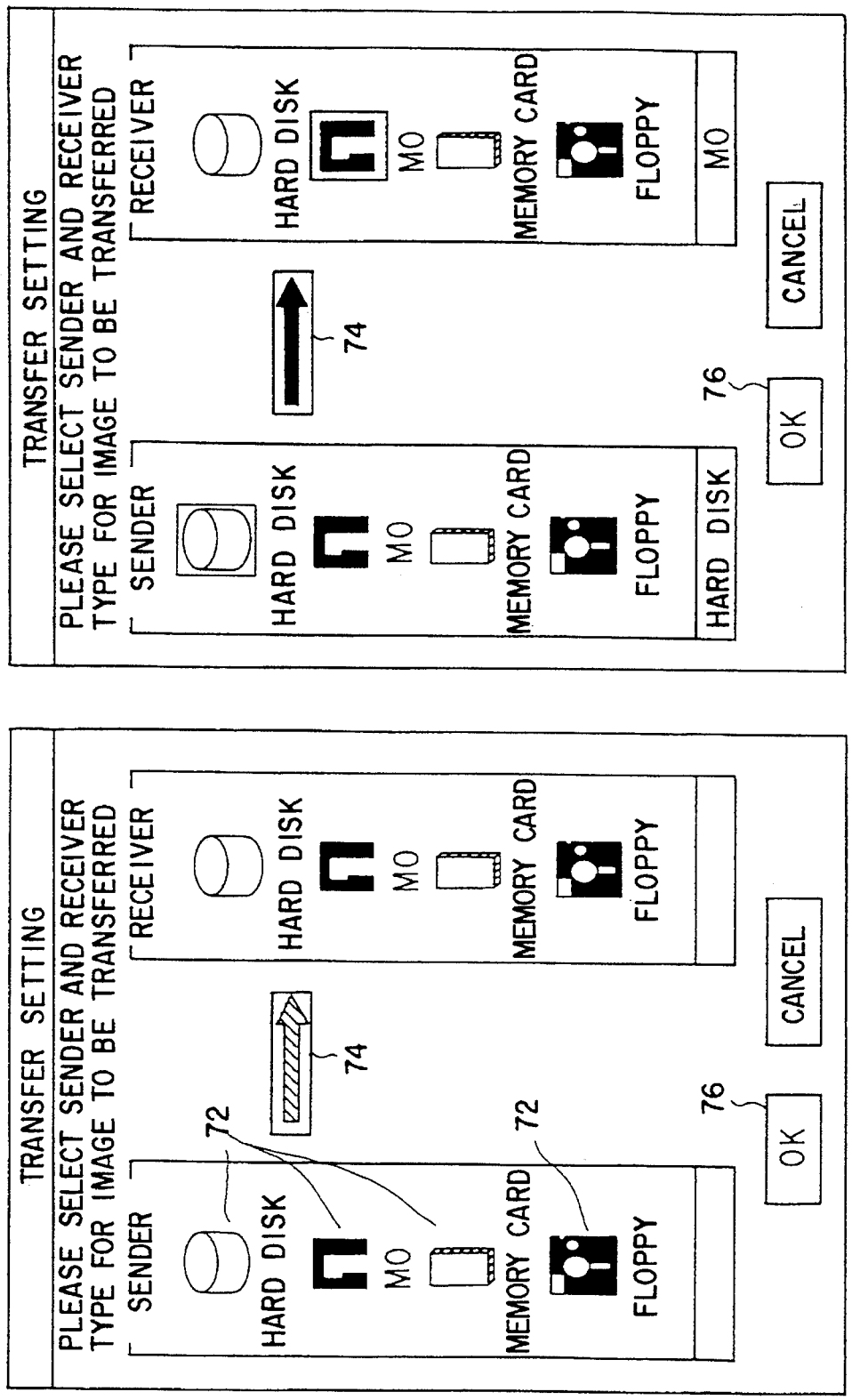

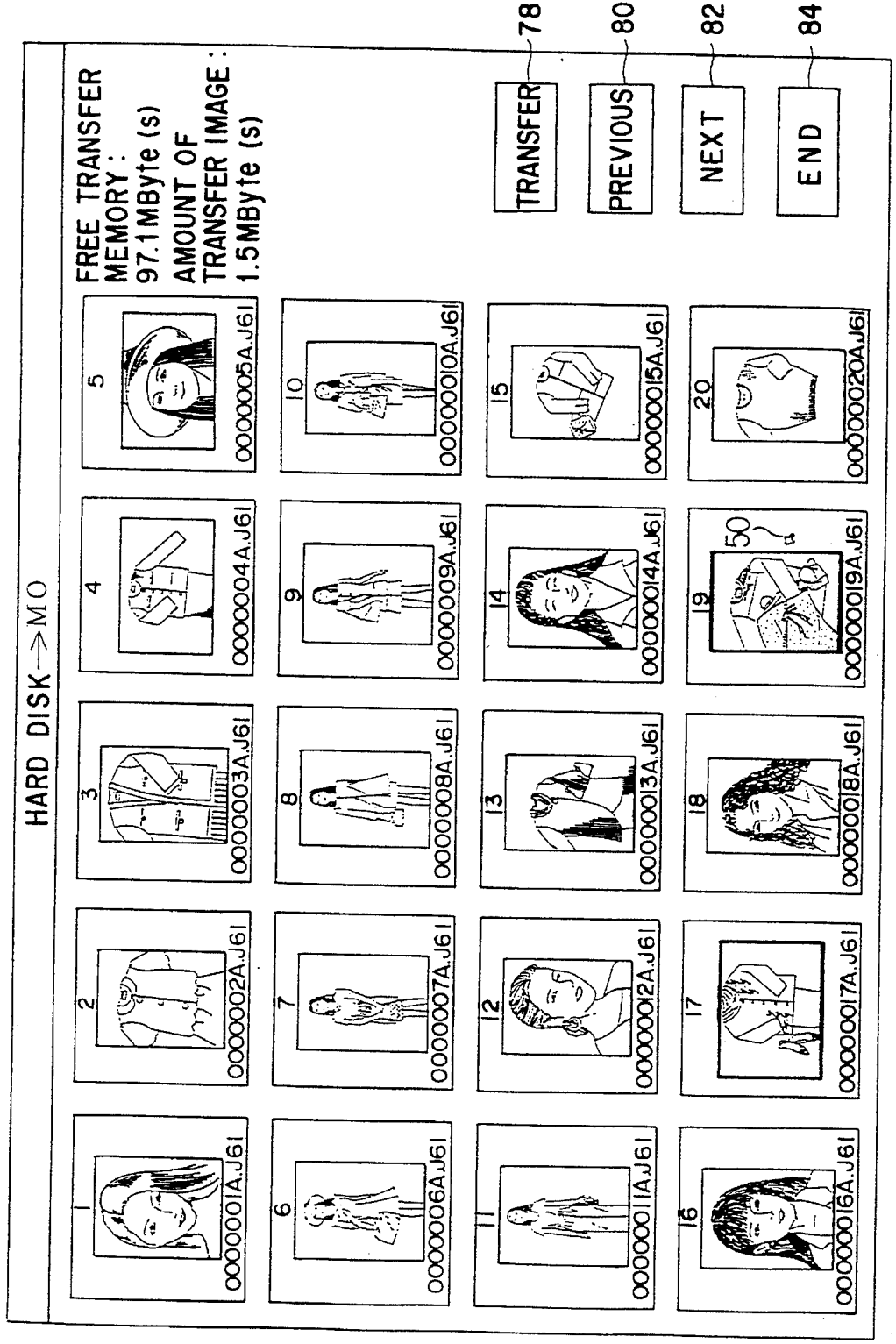
F I G. 25

IMAGE STORING MANAGING APPARATUS AND METHOD FOR RETREIVING AND DISPLAYING MERCHANDISE AND CUSTOMER SPECIFIC SALES INFORMATION

BACKGROUND OF THE INVENTION

1. Field of the Invention

The present invention relates to an image storage managing apparatus and image storage managing method for properly retrieving and displaying stored image data.

2. Description of the Related Art

For shops and sales companies which sell merchandise, sales management of merchandise and customer management are important managerial work.

Recently, POS (Point Of Sales) management has been introduced for sales management. With the use of this POS management, as a bar code affixed to a merchandise is read out, data on which merchandise has been sold is registered so that it is possible to discriminate how well individual merchandise has been sold and this information can be an index for placing an order for merchandise or sending back some merchandise. Accumulating such information provides a way to easily discriminating which merchandise is sold in which season, on which day of the week and in which time zone. It is apparent that sales management has been computerized significantly.

Customer management, however, is often a paper-basis process involving customer cards or the like. Further, the contents of the management information contain only imageless, character information. In some cases, a silver photograph or Polaroid photograph may merely be stuck on each customer card.

Attempts have also been made towards the computerization of the customer management. In this computerized system, ID cards of a credit-card size, such as service cards and membership cards, affixed with bar codes or magnetic tapes are issued to individual customers, and various types of information are data-based for the individual customers. In this case, however, accumulated information also consists only of character information.

Although the computerization of both the merchandise sales management and customer management is progressing gradually, those managements are independent of each other and are not linked to each other. For instance, for convenience stores, it is not so important who bought what, i.e., it is not considered so important what merchandise has been sold to which people.

However, there are some fields in which it is very important what merchandise has been sold to what people. In the apparel field, for example, if the preferences and purchase history is known, this known bought what merchandises or clothes is known, this information becomes very effective in planning and selling clothes. This system requires image data as well as character data.

SUMMARY OF THE INVENTION

It is therefore an object of the present invention to ensure the management of merchandise information containing images and customer information also containing images in association with each other.

To achieve the above object, according to one aspect of this invention, there is provided an image storage managing apparatus comprising:

customer data storage means for storing various types of information on each customer together with image data thereof;

merchandise data storage means for storing various types of information on each merchandise together with image data thereof;

sales data storage means for storing customer-merchandise link data for each customer, indicating merchandises purchased by the customer; and customer-merchandise retrieving means for retrieving information on a specific customer and information on each merchandise purchased by the specific customer from the customer data storage means and the merchandise data storage means based on the customer-merchandise link data stored in the sales data storage means, and displaying those information with images in association with each other.

According to another aspect of this invention, there is provided an image storage managing method comprising the steps of:

storing various types of information on each customer together with image data thereof in customer data storage means;

storing various types of information on each merchandise together with image data thereof in merchandise data storage means;

storing customer-merchandise link data for each customer in sales data storage means, the link data indicating merchandises purchased by the customer; and retrieving information on a specific customer and information on each merchandise purchased by the specific customer from the customer data storage means and the merchandise data storage means based on the customer-merchandise link data stored in the sales data storage means, and displaying those information with images in association with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram exemplifying the actual customer retrieval list display in FIG. 3;

FIG. 9 is a diagram showing a further example of the customer-merchandise purchase display in FIG. 3;

FIG. 11 is a diagram exemplifying the actual merchandise data individual display in FIG. 3;

FIG. 12 is a diagram exemplifying the actual memo data list display;

FIGS. 22A and 22B are diagrams showing transfer setting screens;

FIG. 25 is a diagram showing the discriminative display of images which are selected to be transferred in the image list display screen;

DETAILED DESCRIPTION OF THE PREFERRED EMBODIMENTS

Preferred embodiments of the present invention will now be described referring to the accompanying drawings. The following description will be given of the case where this invention is applied to a small apparel shop which plans, manufactures and retails clothes. This is to be considered as illustrative and not restrictive and the invention may be adapted for larger apparel shops or other businesses.

Figure 1:
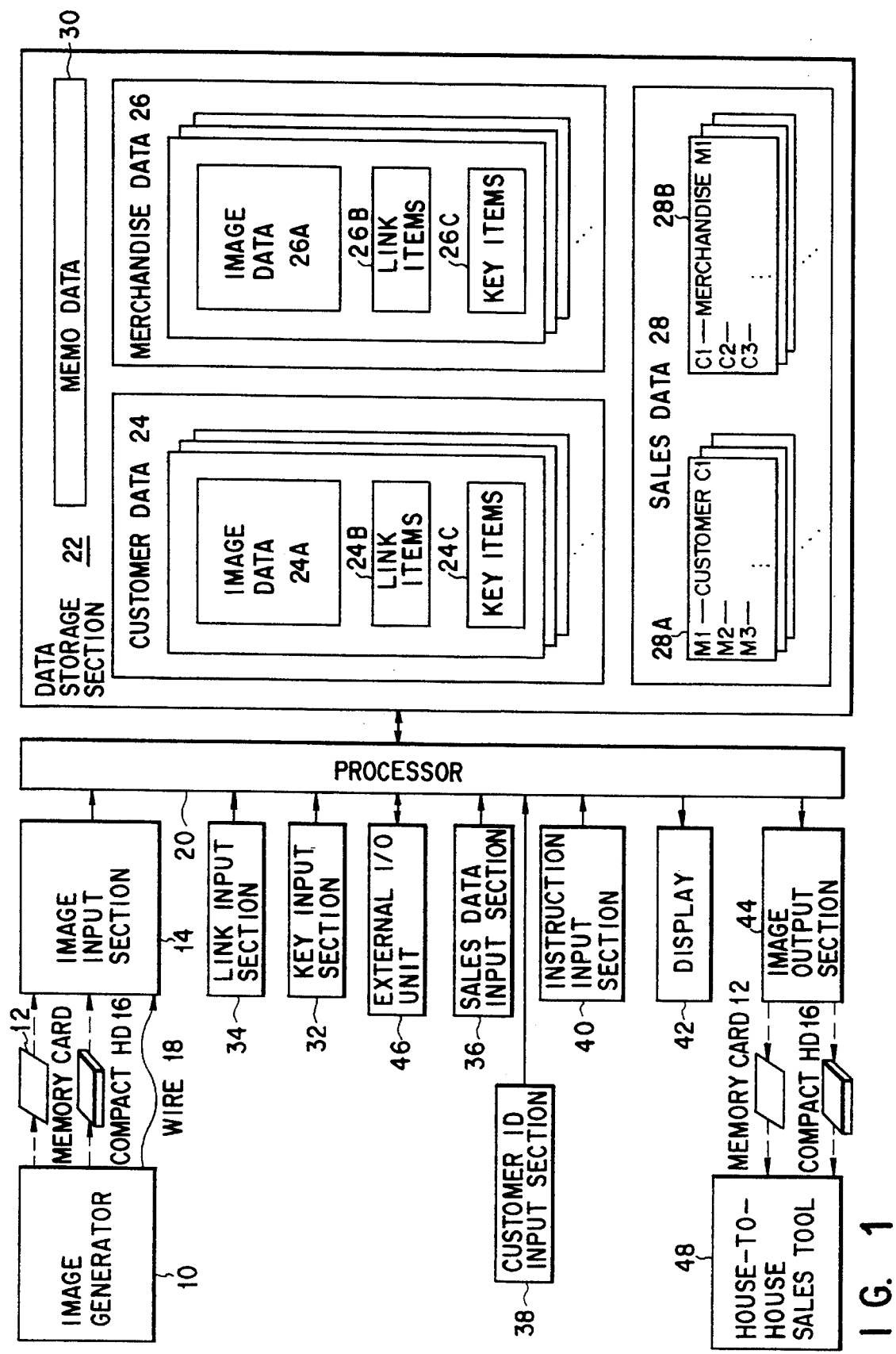
FIG. 1 is a diagram illustrating the structure of a first embodiment of the present invention.

In FIG. 1 showing the structure of a first embodiment of this invention, an image generator 10 picks up the images of merchandise and customers to generate their image data. A card camera, such as an electronic still camera, which electronically stores picked-up image data into a recording medium like a memory card may be used as this image generator 10. This card camera is equipped with a small color display, e.g., liquid crystal display, for displaying image data stored in the recording medium, and may be connected to a color video printer or the like as needed to print out the image data.

The image data generated by the image generator 10 is supplied to an image storage managing section that is constituted by, for example, a personal computer system. In this case, the supply of image data is accomplished by dismounting a memory card 12 as a recording medium from the card camera, installing the memory card 12 in an image input section 14, e.g., a card reader, and then reading the stored data from the memory card 12. Alternatively, a compact hard disk (HD) 16 may be used as a recording medium, or the image generator 10 may be directly connected to the image input section 14 via a wire 18.

The image data input from the image input section 14 is stored in a data storage section 22 under the control of a processor 20. A recording medium, such as a hard disk, a magneto-optical disk or a laser disk, may be used as this data storage section 22. The data storage section 22 includes a customer data storage section 24 for storing customer data, a merchandise data storage section 26 for storing merchandise data, a sales data storage section 28 for storing sales data and a memo data storage section 30 for storing other various types of data.

The customer data storage section 24 stores data in an image data section 24A, a link item section 24B and a key item section 24C for each customer image data input through the image input section 14. The image data stored in the image data section 24A alone just forms images. To indicate to which customer the image data belongs, key data, such as the name, address and telephone number, is stored in the key item section 24C. This key data is written by the processor 20 in accordance with the input operation of a key input section 32 like a keyboard. The image data (24A) does not exist alone but is associated with some other pictures and/or files. That is, for the same customer, image data contains a plurality of images, such as a full-size image, a half-size image and a face image, which should be linked to one another to prevent the disordered arrangement of the images. In this respect, link data to link those images from one to another is stored in the link item section 24B. In other words, least associated image data can be linked together by this link data. This link data is written by the processor 20 in accordance with the input operation of the link input section 34 like a keyboard.

Like the customer data storage section 24, the merchandise data storage section 26 stores data in an image data section 26A, a link item section 26B and a key item section 26C for each merchandise image data input through the image input section 14.

The sales data storage section 28 stores sales data as customer-merchandise link data and customer-merchandise link data. Customer-merchandise link data 28A indicates a merchandise M purchased by each customer C, which is stored for that customer C. Likewise, customer-merchandise link data 28B indicates a customer C who has purchased each merchandise M, which is stored for each merchandise M. In other words, if there are some pieces of merchandise data, the sales data storage section 28 stores information on, for example, when a merchandise one (M1) was purchased by which customer C, or when the merchandise M1 was sold to a certain customer C1. This sales data is written by the processor 20 in accordance with the input operation of the keyboard for a manual input or the input operation of a sales data input section 36, which is constituted as a POS terminal, for an automatic input.

The memo data storage section 30 stores various kinds of image data for reference, e.g., buttons, designs and images of magazines. Like the customer data storage section 24 and the merchandise data storage section 26, this memo data storage section 30 stores data in an image data section, a link item section and a key item section for each image data input from the image input section 14 though not illustrated.

Further connected to the processor 20 are a customer ID input section 38, an instruction input section 40, a display 42, an image output section 44 and an external input/output (I/O) unit 46.

To retrieve images, associated with a customer when this customer came to the shop previously, from the data storage section 22, the shop should quickly find out who the customer is or the name and the number of that customer. In this respect, the customer ID input section 38 is provided. More specifically, this customer ID input section 38 serves to input data specifying each customer in order to make the use of available associated images even if the name of the customer is not forgotten or known. The customer ID input section 38 may be a card reader or bar code reader which reads out data specifying each customer from an ID card issued to that customer. Alternatively, the customer ID input section 38 may be a keyboard or voice input ten keys through which the customer inputs the ID number. In the latter case, however, some measures should be taken to cause each customer to enter his or her own ID number willingly. For example, when a customer comes shopping in a shop where every customer is asked to change the shoes to slippers, an attendant could say something like "please give me your ID number and we will bring the slippers you wore last time" to obtain the ID number such as the telephone number from the customer. In this case, the slippers are used as a tool to convince each customer that the ID number is needed to have the slippers particularly prepared for that customer.

The instruction input section 40 is a keyboard or a mouse for instructing the processor 20 to execute retrieval or the like of data in the data storage section 22, and the display 42 is a CRT monitor or the like for displaying the results of the retrieval.

The image output section 44, as opposed to the image input section 14, is a card writer for writing image data, read from the data storage section 22, onto the memory card 12 as a recording medium. The image output section 44 may be a device which writes image data on a compact HD 16 as a recording medium.

The recording medium, such as the memory card 12 or compact HD 16, is installed in a house-to-house sales tool 48. The card camera in the image generator 10 may be used directly as this tool 48. That is, image data electronically stored in the installed recording medium may be displayed on a small color display like a color liquid crystal display or the card camera may be connected to a color video printer or the like as needed to print out the image data to help explain popular merchandise in a customer's house, another sales company, a retail shop or the like. Assuming that there are top ten well-selling clothes and information thereon are stored and organized in the data storage section 22, then the mobility is apparently improved significantly if the images of those clothes are saved on a recording medium, such as the memory card 12, and the salesman or saleswoman brings the recording medium and the card camera along than if the salesperson actually brings the clothes along. The house-to-house sales tool 48 may be a compact and light computer or a so-called notebook computer, as well as the card camera.

The external I/O unit 46 includes an interface to external memory devices, such as an FD drive, MO drive and CD-ROM drive, and an image scanner that is used as an auxiliary image input section.

The thus constituted image storage managing apparatus can register an input image in a computer, and can retrieve individual image-containing information and display the retrieval results in some cases or can display the images of both a customer and a merchandise in association with each other to clarify the correlation between the customer and merchandise.

Figure 2:
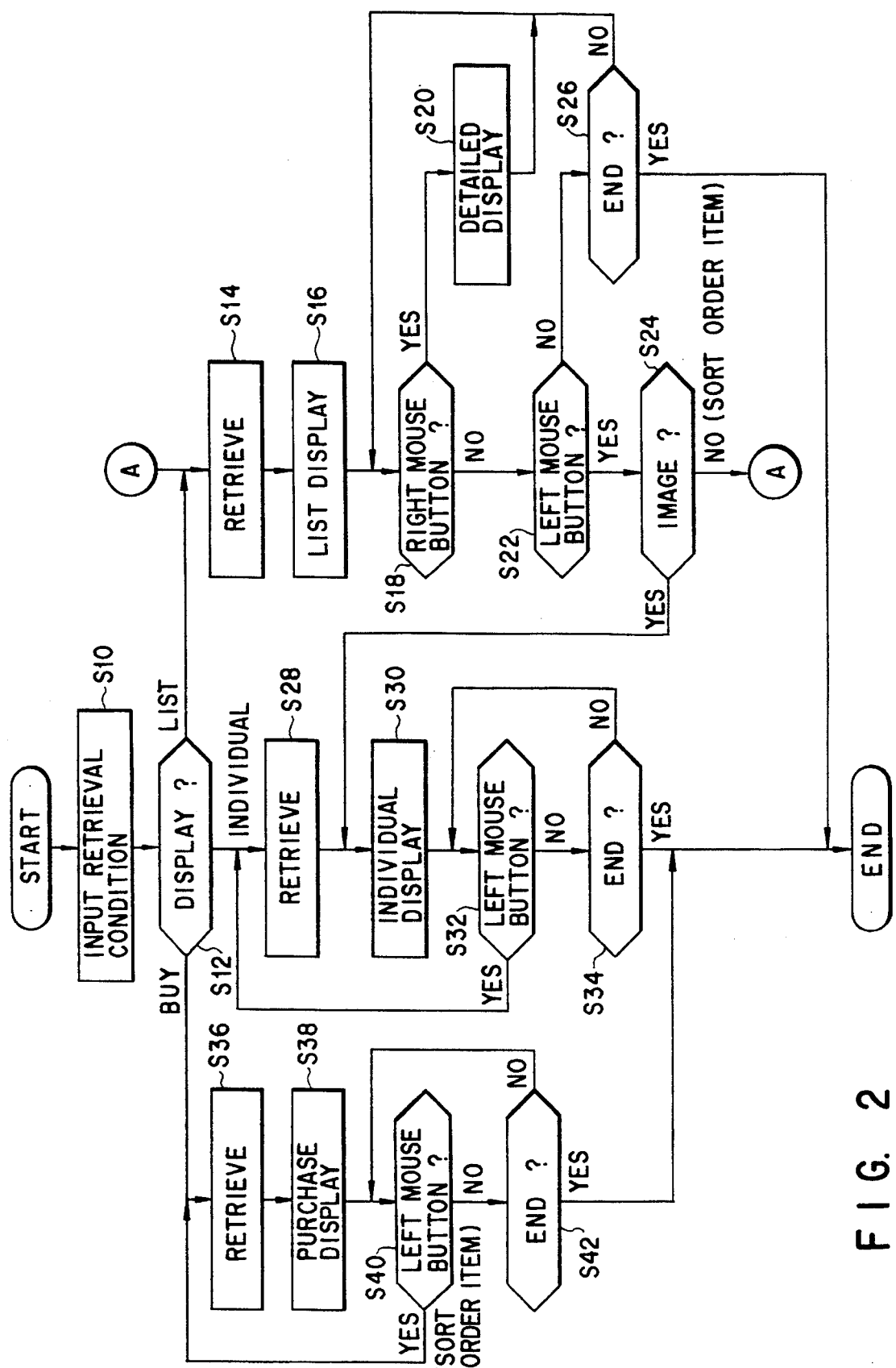
FIG. 2 is a flowchart illustrating a retrieval process executed by a processor in FIG. 1.
Figure 3:
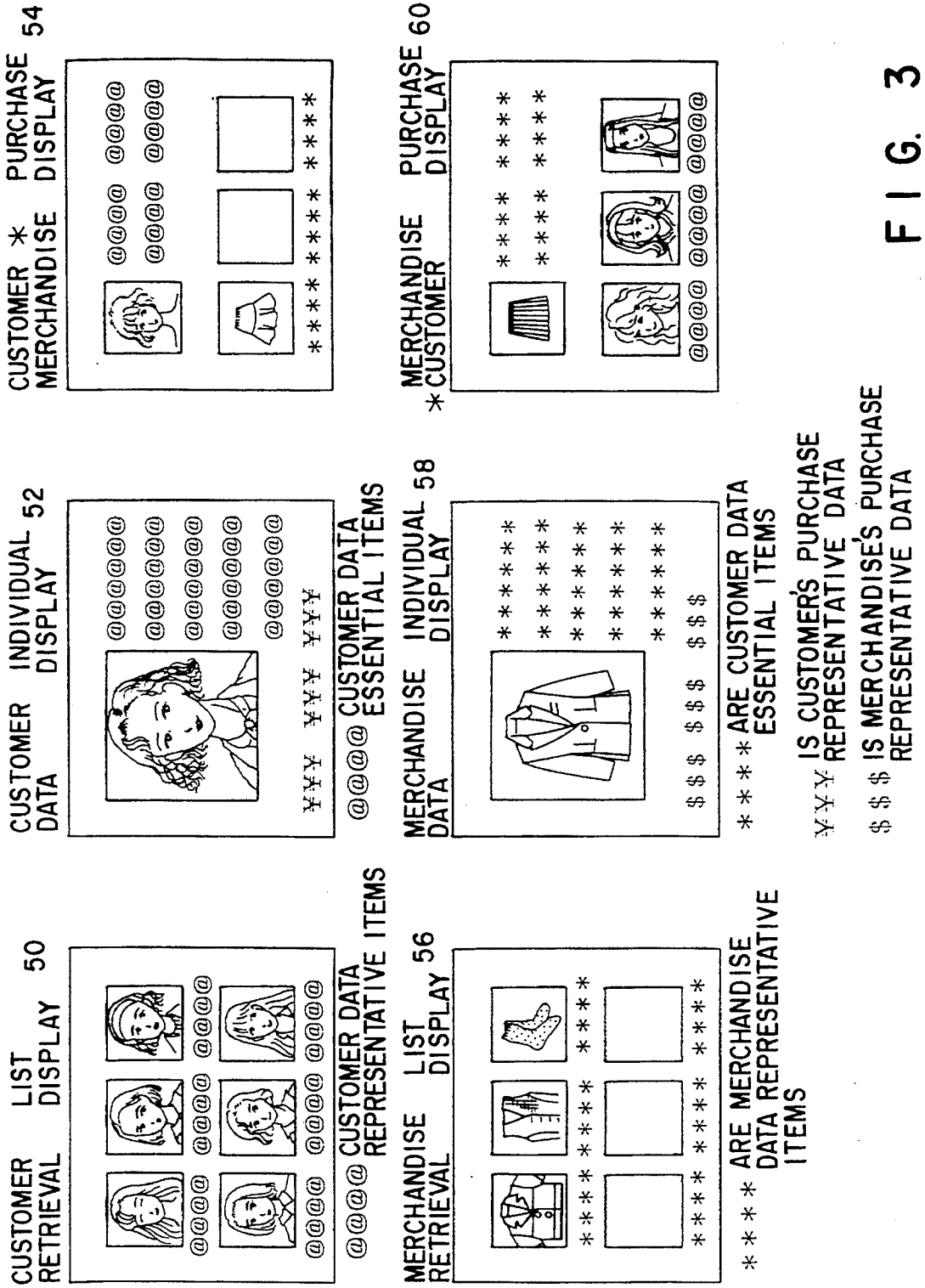
FIG. 3 is a diagram showing various retrieval results.

FIG. 2 presents a flowchart illustrating a retrieval process executed by the processor 20. With a vast amount of data already stored in the data storage section 22, when a retrieval condition is input as needed through the instruction input section 40 to instruct retrieval of customers (step S10), the processor 20 selects a list display as one way of displaying the retrieval result (step S12), and searches the customer data storage section 24 in the data storage section 22 (step S14). The processor 20 then displays an image and characters (customer data representative items) which match with the input retrieval condition on the display 42 as a customer retrieval list display 50 (step S16) as shown in FIG. 3. This customer retrieval list display 50 actually becomes the one shown in FIG. 4.

When an operator operates a mouse of the instruction input section ₄0 to move a mouse cursor 40C to a target image and then clicks the right mouse button (step S18), detailed information about that image is read out from the key item section 24C and is displayed around the image (step S20) as shown in FIG. 4. If the left mouse button is clicked (step S22), the processor 20 determines whether or not the mouse cursor 40C is pointing an image (step S24). If the mouse cursor 40C is pointing a sort order item, not an image, the processor 20 returns to the aforementioned step S14 and searches the customer data storage section 24 again in accordance with the indicated sort order. If it is determined in the step S24 that an image is pointed, the processor 20 proceeds to step S30 to be described later.

When the termination of the retrieval process is instructed through the unillustrated keyboard of the instruction input section 40 (step S26), the processor 20 terminates the retrieval process.

when a retrieval with a customer name or the like as a key is specified through the instruction input section 40 in the step S10, the processor 20 selects an individual display as one way of displaying the retrieval result (step S12), and searches the customer data storage section 24 in the data storage section 22 (step S28). The processor 20 then displays an image and characters (customer data essential items) which match with the input retrieval condition on the display 42 as a customer data individual display 52 (step S30) as shown in FIG. 3. When an image is selected in the list display 50 in step S24, this customer data individual display 52 can be given for the selected image.

Figure 5:
FIG. 5 is a diagram exemplifying the actual customer data individual display in FIG. 3.
Figure 6:
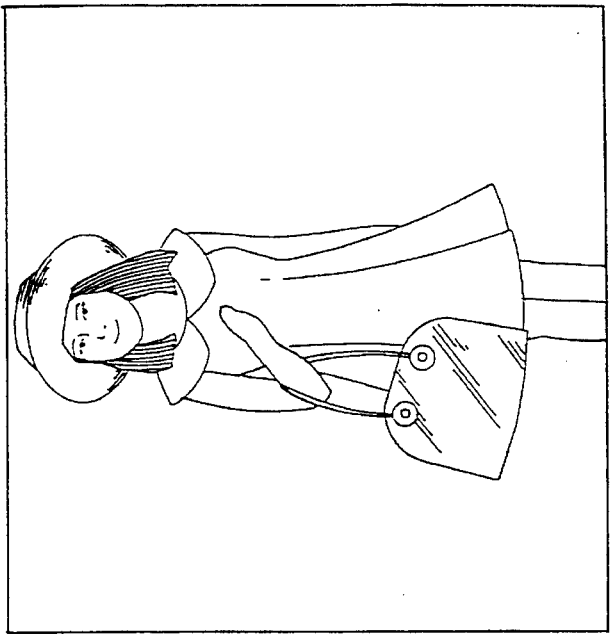
FIG. 6 is a diagram showing another example of the customer data individual display in FIG. 3.

This customer data individual display 52 actually becomes as shown in FIG. 5 or FIG. 6. FIG. 5 shows a face image fetched as the image of the customer. When the operator points the mouse cursor 40C to, for example, "full-length image" in the individual display as indicated in FIG. 5 and then clicks the left mouse button (step S32), the flow returns to the step S28 to retrieve the image data of the full-length image linked by the link data of the image data in the link item section 24B, and the display is switched to the full-length image display as shown in FIG. 6. If the full-length image of the customer, instead of the face image alone, is shown, an attendant can better understand what kinds of clothes the customer prefers. The items, such as the aforementioned "full-length image," are displayed when selectable images are available based on the link data set in the link item section 24B.

When the termination of the retrieval process is instructed through the unillustrated keyboard of the instruction input section 40 (step S34), the processor 20 terminates the retrieval process.

Figure 7:
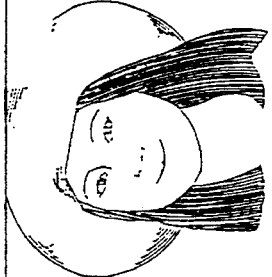
FIG. 7 is a diagram exemplifying the actual customer-merchandise purchase display in FIG. 3.

When a retrieval with a key to specify a customer and an instruction to retrieve merchandises purchased by this customer are input through the instruction input section 40 in the step S10, the processor 20 selects a purchase display as one way of displaying the retrieval result (step S12), and executes a retrieval based on sales data (step S36). The processor 20 then displays the retrieval results on the display 42 as a customer-merchandise purchase display 54 (step S38) as shown in FIG. 3. This customer-merchandise purchase display 54 actually becomes as shown in FIG. 7.

When the operator moves the mouse cursor 40C to a sort order item and then clicks the left mouse button (step S40), the flow returns to the step S36 to search the customer data storage section 22 again in accordance with the sort order specified by the mouse cursor 40C then.

When the termination of the retrieval process is instructed through the unillustrated keyboard of the instruction input section 40 (step S42), the processor 20 terminates the retrieval process.

Figure 8:
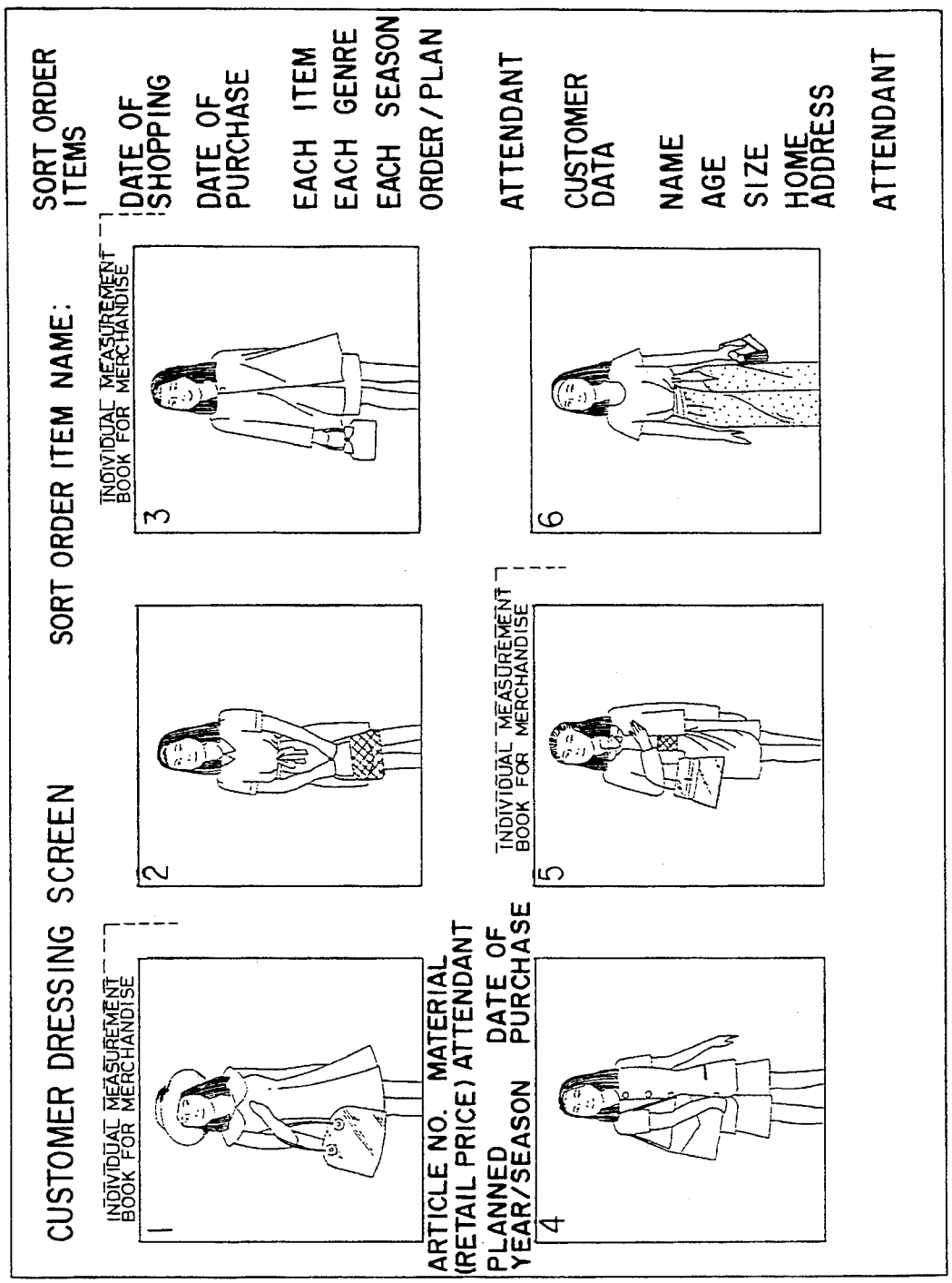
FIG. 8 is a diagram showing another example of the customer-merchandise purchase display in FIG. 3.

If the images of clothes the customer has tried on every occasion besides the merchandises actually purchased are stored, those images can also displayed together with the retrieval results as shown in FIG. 8 or FIG. 9. This allows the attendant to give some advices on the selection of merchandises in light of the total coordination with the clothes the customer already owns.

Figure 10:
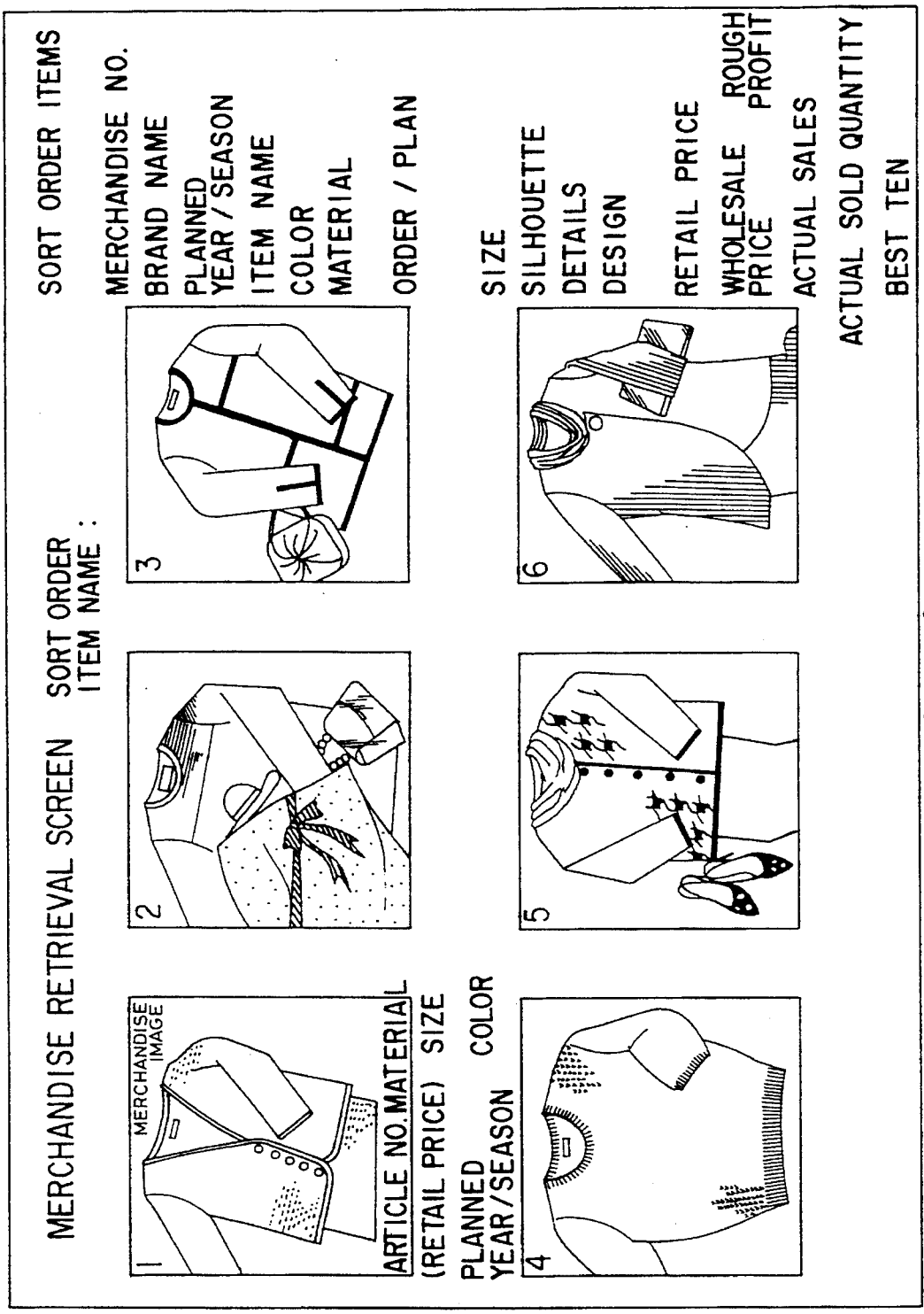
FIG. 10 is a diagram exemplifying the actual merchandise retrieval list display in FIG. 3.
Figure 13A:
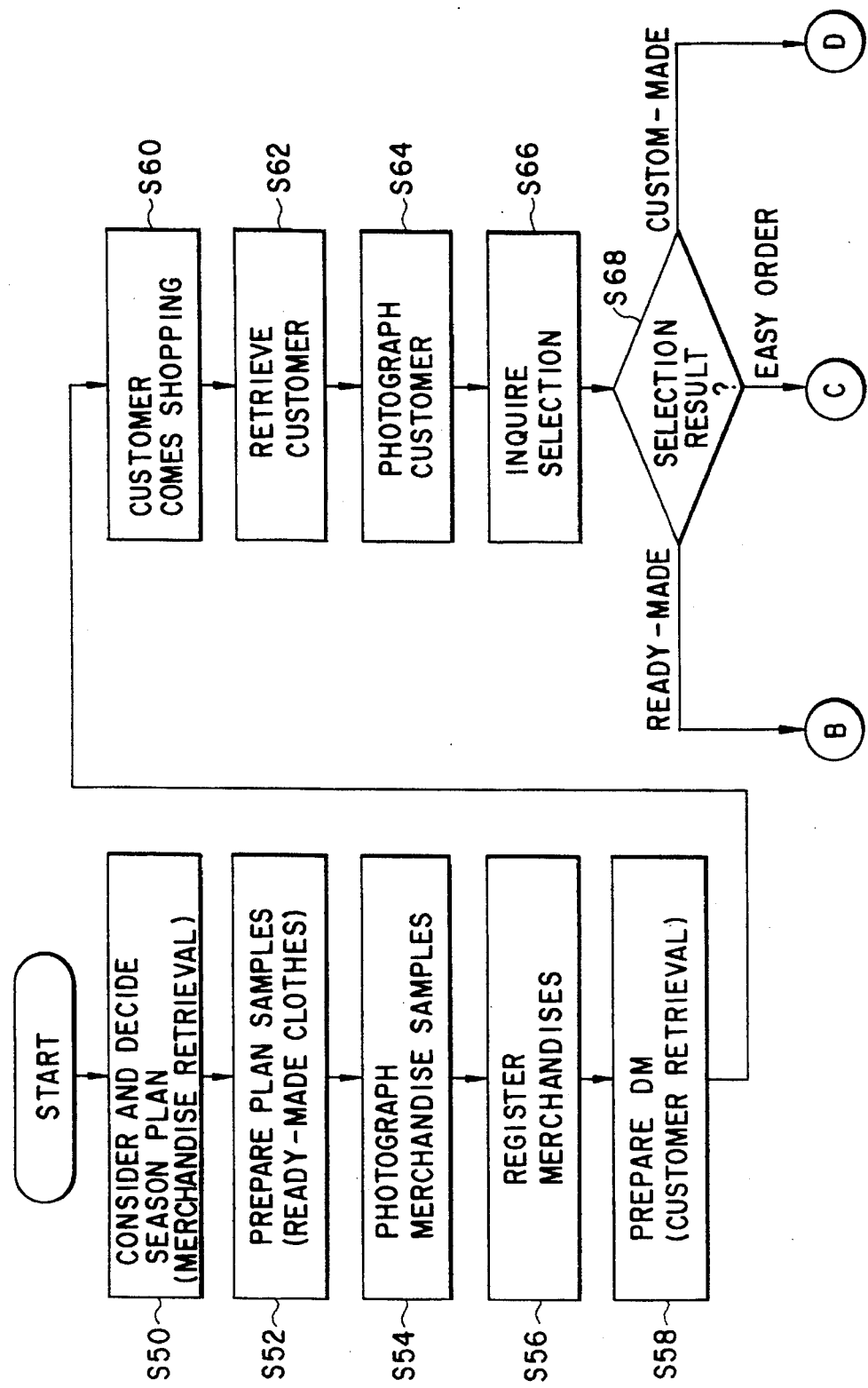
FIGS. 13A through 13E present a sequence of flowcharts for explaining the timing for storing image data and the actual utilization of the stored image data.
Figure 13B:
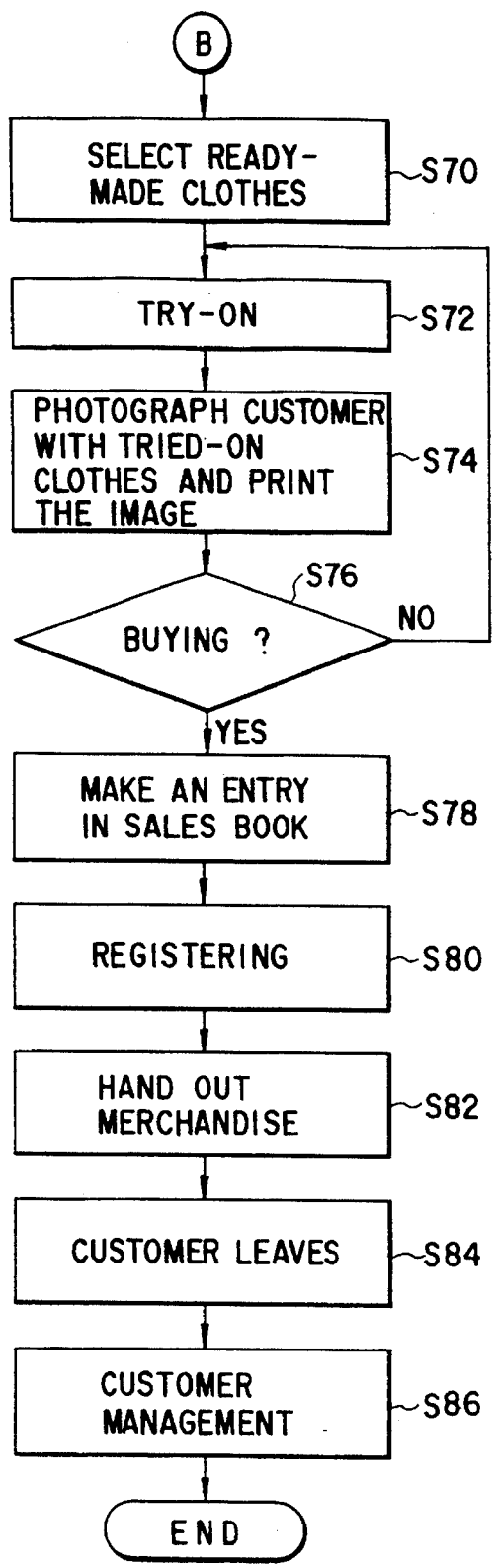
Figure 13C:
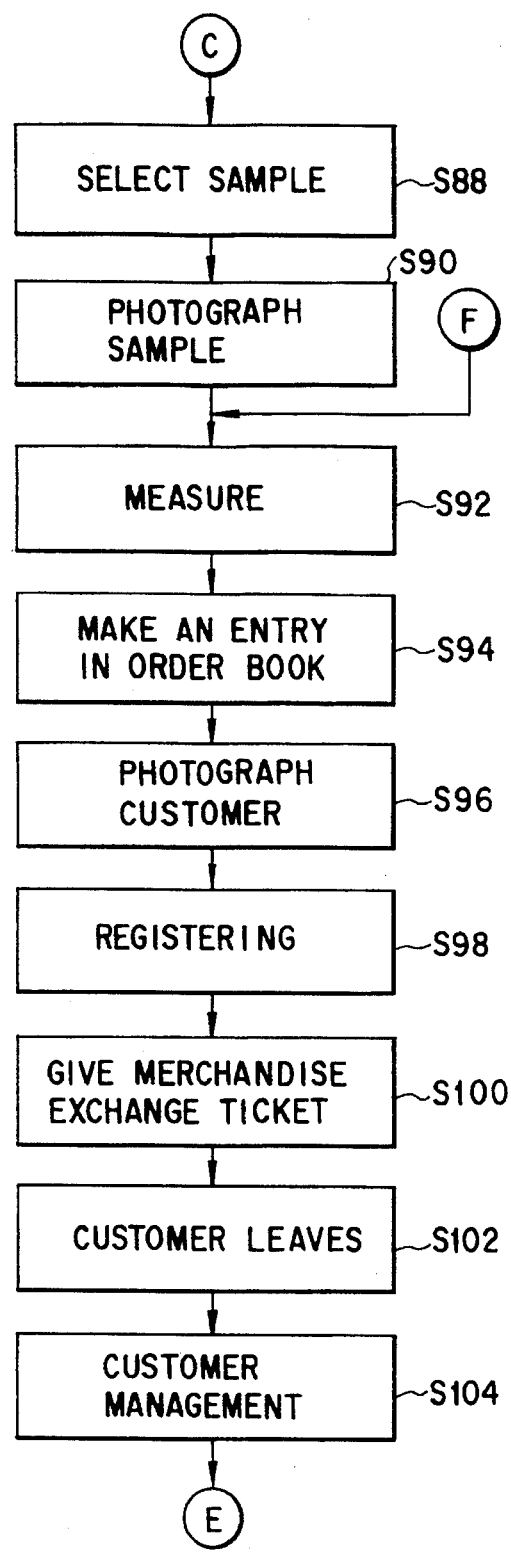
Figure 13D:
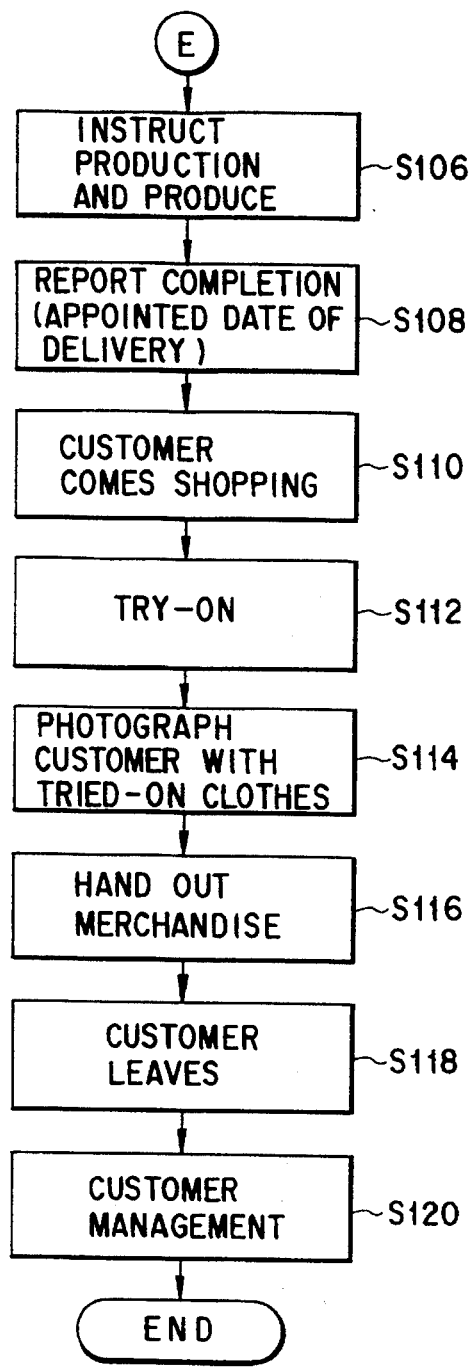
Figure 13E:
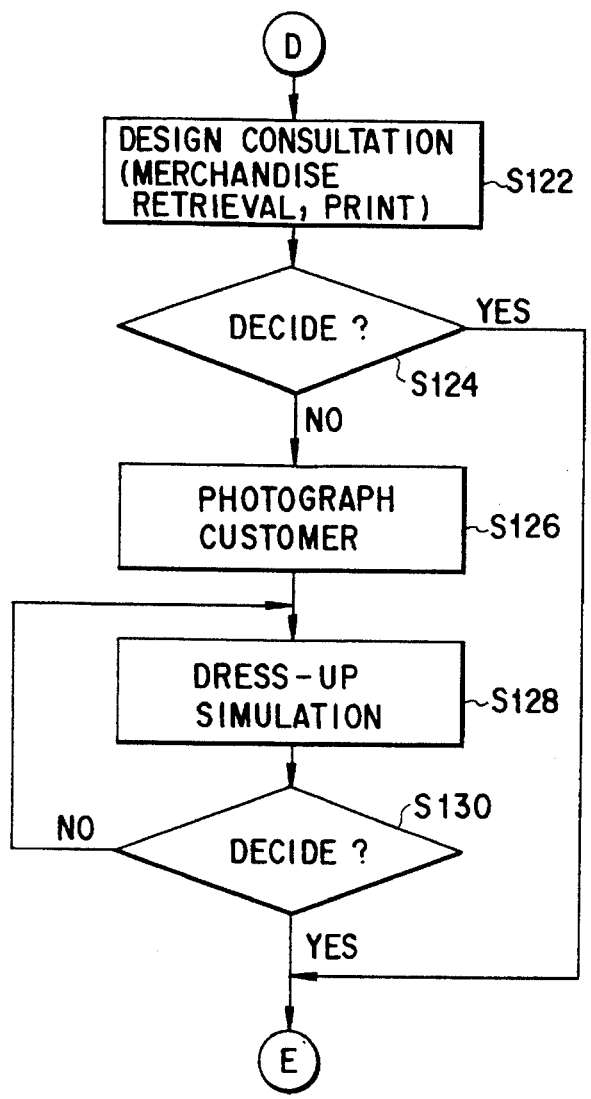

With regard to merchandises, as in the above-described case of the customer, as a retrieval condition is input as needed through the instruction input section 40, the processor 20 searches the data storage section 22 for images and characters which match the retrieval condition, and displays the retrieval results on the display 42 as a merchandise retrieval list display 56 as shown in FIG. 3. This merchandise retrieval list display 56 actually becomes as shown in FIG. 10.

If any image in the merchandise retrieval list display 56 is specified or a retrieval with a merchandise name as a key is instructed by the instruction input section 40, the retrieval results are displayed as a merchandise data individual display 58 as shown in FIG. 3. This merchandise data individual display 58 actually becomes as shown in FIG. 11. If there are selectable images, those items are also displayed.

When a key specifying a merchandise and an instruction to retrieve the customers who bought the merchandise are input through the instruction input section 40, the processor 20 performs the retrieval process based on sales data and displays the retrieval results on the display 42 as a customer-merchandise purchase display 60, as shown in FIG. 3.

As various kinds of information for reference including button data, design data, town data and measurement data are also stored as memo data in the data storage section 22, those information can also be searched. That is, as in the case of the customer and the case of the merchandise, a list display or an individual display as shown in FIG. 12 may be presented.

The timing for storing image data and the actual utilization of the stored image data will be described below with reference to a sequence of flowcharts shown in FIGS. 13A to 13E.

First, based on information stored in the data storage section 22, a variety of clothes are planned and considered to determine which clothes should actually be made (step S50). That is, it is possible to design clothes based on old merchandise images and information on magazines by referring to the merchandise retrieval list display 56, the merchandise data individual display 58 and memo data display.

Then, clothes whose production has been decided are prepared as samples (ready-made clothes) (step S52), and the samples are photographed by the card camera of the image generator 10 (step S54). The picked-up image data of the merchandise are input through the image input section 14 and link data and key data are input through the link input section 34 and the key input section 32, and those data are then registered in the merchandise data storage section 26 in the data storage section 22 (step S56).

Next, direct mails (DMs) to limited customers are prepared referring to the customer retrieval list display 50, the customer data individual display 52 and the customer-merchandise purchase display 54 and are mailed (step S58). At this time, the images of the merchandise, which are saved in the house-to-house sales tool 48 from the image output section 44 and are printed from a video printer or the like, may be used for the DMs.

When a customer actually comes to the shop (step S60), the ID number or the like is input from the customer ID input section 38 to search the data storage section 22 and present the customer data individual display 52 and the customer-merchandise purchase display 54 (step S62). This system can provide the brief information on the customer, so that even if the attendant in charge for the customer is not present, the customer can properly be attended. Next, the attendant photographs the customer with the card camera of the image generator 10, prints out the photograph from the video printer and presents the print to the customer as a remembrance (step S64). The attendant then asks the customer the purpose of his or her coming to the shop, i.e., asks the customer if he or she wants to buy some ready-made clothes or prepare easy-made clothes or custom-made clothes (step S66).

If the customer came to buy some ready-made clothes (step S68), the attendant shows the proper merchandises according to the clothes purchased earlier or the image of the clothes the customer is currently wearing or in accordance with the customer's present request to allow the customer to select a desired merchandise (step S70). If there is any desired merchandise, the attendant asks the customer to actually try it on (step S72), takes a picture of the customer and then prints out the photograph from the video printer (step S74). The print can therefore be used in place of an image on an ordinary mirror, and different postures with different merchandise on can easily be compared with one another. Even if some merchandise is out of stock, the images of the merchandise can be shown to the customer as additional candidates. In this manner, merchandise sold out or old merchandise can be counted as selling merchandise.

When an item of merchandise to be purchased is decided upon (step S76), the attendant enters the necessary information, such as the size, the name of the customer, the address, the telephone number, the name of the merchandise, the material and the price, in the sales book (step S78), receives the money (step S80), and hands out the merchandise to the customer (step S82). Then, the customer brings the merchandise home (step S84). At the time data is entered in the sales book, the necessary entries can be made by referring to the customer data individual display 52, thus eliminating the need for asking the customer for the name, etc.

After the customer leaves the shop, the customer management process is performed (step S86) as follows. The recording medium, such as the memory card 12, is removed from the card camera of the image generator 10 and is placed in the card reader of the image input section 14 to input the image data to the data storage section 22. The customer retrieval list display 50 including the image data, the customer data individual display 52, the customer-merchandise purchase display 54, or the like is displayed and by referring to this display and the data-entered sales book, the attendant operates the link input section 34, the key input section 32, the sales data input section 36, etc., i.e., operates the keyboard to input the necessary data.

If data is directly read from the customer's ID card or the bar code on the tag put on each item of merchandise, the aforementioned entry to the sales book becomes unnecessary and the amount of input data in the customer management process can be reduced greatly.

If the customer came to order some easy-made clothes (step S68), the attendant shows samples for easy-made clothes according to the clothes purchased earlier or the image of the clothes the customer is currently wearing or in accordance with the customer's present request to allow the customer to select a desired sample (step S88).

If there is any desired sample, the attendant takes a picture of the sample (step S90). Further, various measurements of the customer are obtained (step S92), and the attendant enters the necessary information, such as data on the measurements, the name of the customer, the address, the telephone number, the name of the merchandise, the material, the price, the amount of a deposit and the appointed date of delivery, in the order book (step S78), receives the money (step S94). Further, the attendant takes a picture of the customer, prints out the photograph from the video printer and presents the print to the customer as a remembrance of the purchase (step S96). Upon reception of the price or a deposit (step S98), the attendant hands out a merchandise exchange ticket or the like to the customer (step S100). Then, the customer brings the ticket home (step 102). At the time data is entered in the order book, the necessary entries can be made by referring to the customer data individual display 52, thus eliminating the need for asking the customer for the name, etc.

After the customer leaves the shop, the customer management process is performed (step S104) as follows. The recording medium, such as the memory card 12, is removed from the card camera of the image generator 10 and is placed in the card reader of the image input section 14 to input the image data to the data storage section 22. The customer retrieval list display 50 including the image data, the customer data individual display 52, the customer-merchandise purchase display 54, or the like is displayed and by referring to this display and the data-entered sales book, the attendant operates the link input section 34, the key input section 32, the sales data input section 36, etc., i.e., operates the keyboard to input the necessary data.

If data is directly read from the customer's ID card or the bar code on the tag put on each merchandise, the aforementioned entry to the sales book becomes unnecessary and the amount of input data in the customer management process can be reduced greatly. If there is data of the measurements of previously purchased clothes, the step of measuring the size may be partially omitted.

If the ordered clothes are made based on the order book (step S106) and the clothes are complete, the attendant informs the customer of the completion or informs the customer of the expected completion date (appointed date of delivery) (step S108). If the date and time for the next visit of the customer are checked here, the face and name of the customer can be checked in advance referring to the customer data individual display 52. When the customer came to the shop next time to pick up the completed clothes (step S110), therefore, the retrieval as executed in the step S62 becomes unnecessary. If the attendant is not present, the customer can be properly attended after executing the retrieval in the step S62.

Next, the attendant asks the customer to actually try the completed clothes on (step S112), takes a picture of the customer, and then prints out the photograph from the video printer to present the picture to the customer (step S114). After the clothes are wrapped and given to the customer (step S116), the customer brings the merchandise home (step S118).

After the customer leaves the shop, the customer management process is performed (step S120) as follows. The recording medium, such as the memory card 12, is removed from the card camera of the image generator 10 and is placed in the card reader of the image input section 14 to input the image data of the customer with the merchandise on to the data storage section 22. The customer retrieval list display 50 including the image data, the customer data individual display 52, the customer-merchandise purchase display 54, or the like is displayed and by referring to this display and the data-entered sales book, the attendant operates the link input section 34, the key input section 32, the sales data input section 36, etc., i.e., operates the keyboard to input the necessary data.

When the customer having come to the shop wants to order custom-made clothes (step S68), the customer consults with the attendant about the design (step S122) referring to the merchandise retrieval list display 56, the customer data individual display 58 and memo data or some printouts if necessary. That is, the attendant can suggest designs based on the designs of the old merchandises. Once the final design is decided (step S124), the flow proceeds to the aforementioned step S92 to execute a sequence of processes after the size measuring.

If the final design has not been decided yet but there are some candidates (step S124), the attendant takes a picture of the customer and inputs the image via the image input section 14 to the data storage section 22 (step S126). Then, the image of the customer is combined with the images of the candidate designs for simulation to allow the customer to decide the most desirable design (step S128). If the final design is decided (step S130), the flow proceeds to the step S92 to execute a sequence of processes after the size measuring. As the customer is shown only the image of the customer photographed in the step S126, therefore, the customer cannot know that the images photographed at other timings are utilized in the customer management.

Instead of taking a picture of every customer who has come to the shop to store the images of individual customers, which is not so effective, good potential customers may be invited to a show, an exhibition or the like so that their pictures can be taken at that time.

Figure 14:
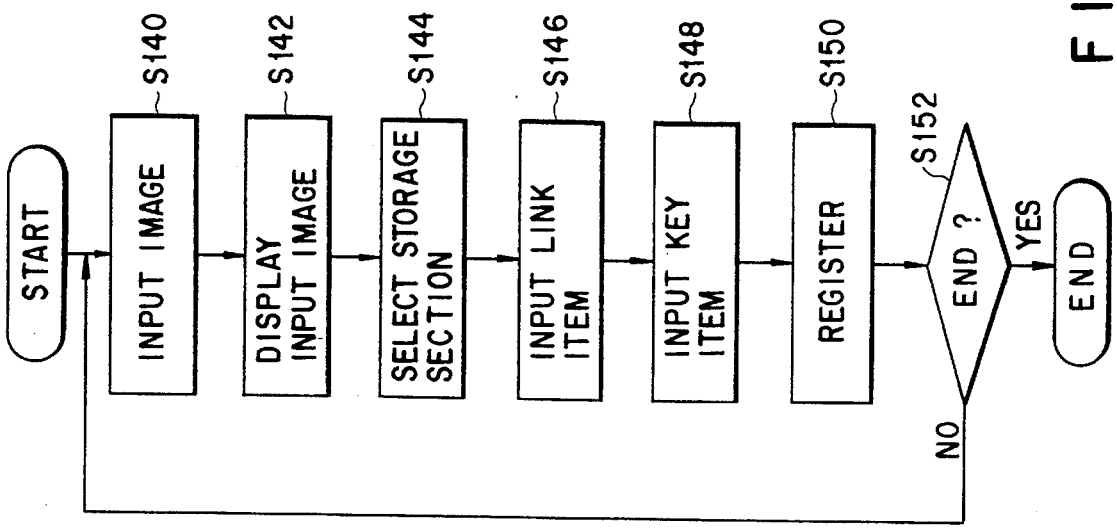
FIG. 14 is a flowchart illustrating a process for inputting images in a data storage section.

The process of inputting images into the data storage section 22 in the aforementioned steps S54, S86, S104, S120 and S126 is executed as illustrated in FIG. 14.

When an image is input from the image input section 14 (step S140), the processor 20 displays it on the display 42 (step S142) to allow the operator to determine what kind of image the input image is, i.e., to determine in which one of the customer data storage section 24, the merchandise data storage section 26 or the memo data storage section 30 the image should be stored. When an instruction to select the storage section where the image should be stored is given through the instruction input section 40 (step S144), then the processor 20 receives link data from the link input section 34 (step S146) and key data from the key input section 32 (step S148). Then, those input images, link data and key data are registered as one record in the selected data storage section (step S150). This processing is repeated for all the images (step S152). If there is an image which need not be registered, the processes from the step S144 to the step S150 can be skipped.

Figure 15:
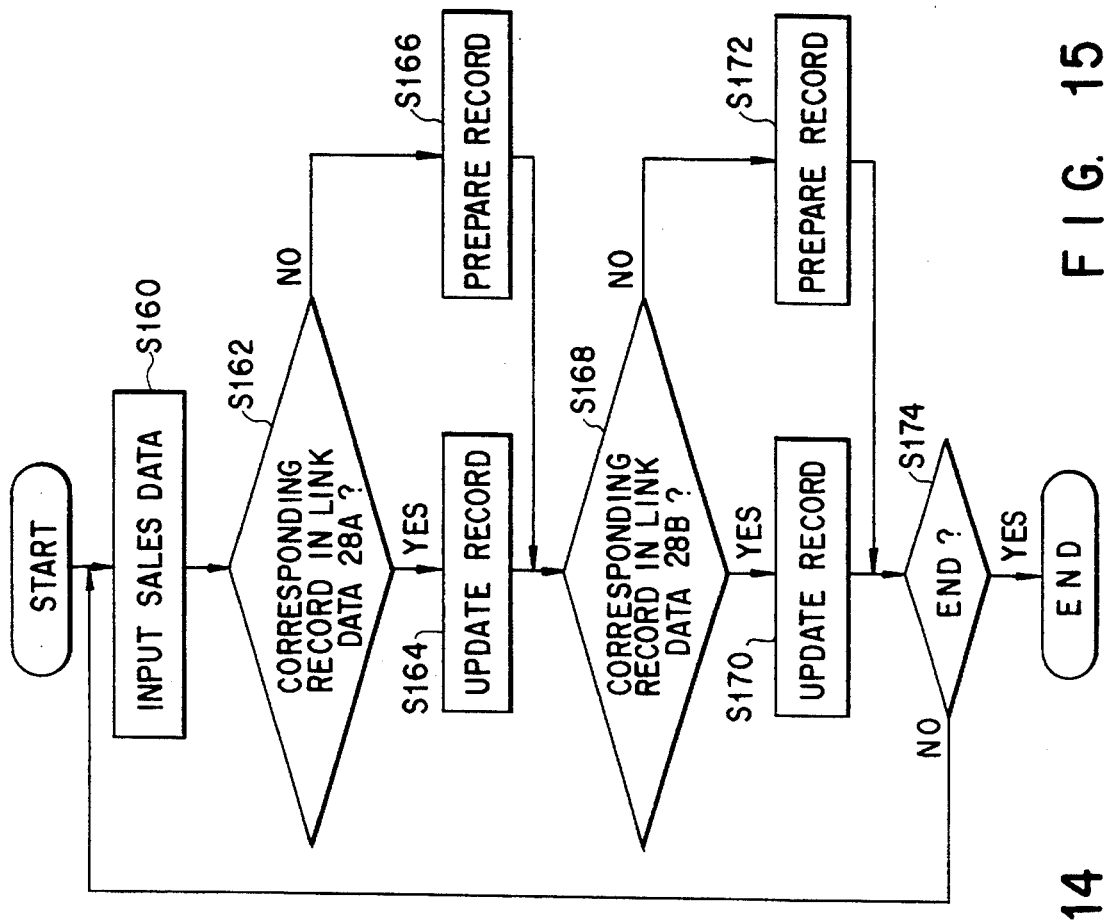
FIG. 15 is a flowchart illustrating a process for inputting sales data in the data storage section.

The process of inputting sales data in the steps S86, S104 and S120 is executed as illustrated in FIG. 15.

When data specifying a customer and data specifying an item of merchandise purchased by this customer are input through the sales data input section 36 or the keyboard (step S160), the processor 20 first searches the customer-merchandise link data 28A in the sales data storage section 28 for a record associated with the customer (step S162). If there is any such record, data indicative of the merchandise purchased by the customer is affixed to that record for renewal (step S164). If there is no associated record, on the other hand, a new record for the customer is created and data indicating the merchandise purchased by the customer is stored (step S166). Next, likewise, the processor 20 searches the merchandise-customer link data 28B in the sales data storage section 28 for a record associated with the merchandise (step S168). If there is any such record, data indicative of the customer who purchased the merchandise is affixed to that record for renewal (step S170). If there is no associated record, on the other hand, a new record for the merchandise is created and data indicating the customer who purchased the merchandise is stored (step S172). This processing is repeated until every sales data is processed (step S174).

The storage management of images in the above manner produce the following various advantages.

If the image of the clothes the customer was wearing when the customer came to the shop is photographed and is stored, the attendant can find out what kind of clothes the customer tends to wear through a series of photographs. The attendant can also find out the preference of the customer and the clothes the customer has. That is, this information is very effective.

With the use of such an image storage management, stores may easily be replaced with corporations. The storage and management of customer data allows a company to manage who a visiting customer is even if the attendant is absent or is not available for some other reasons, and allows the company to hand the customer data as company data.

Further, it is possible to sell merchandise in some coordination based on old purchase data.

In photographing the customer in full size, the user normally holds the camera vertically. In this case, the image to be stored in the recording medium or the image to be displayed on the CRT display would be a sideways image rotated 90 degrees from the vertical posture. It is therefore necessary to perform the vertical/horizontal conversion of the image at the time the data from the image input section 14 is stored in the data storage section 22, or at the time the image data is retrieved from the data storage section 22 and is displayed on the display 42. The vertical/horizontal conversion can be instructed through the instruction input section 40. It is more preferable that the vertical posture or horizontal posture should automatically be discriminated from the image of the clothes in the photographed image or the position of the face of the customer in that image. Assuming that the image data is limited to either clothes or a customer, then the face, one prominent feature of a human body, should extend along the longer axis, so that the vertical posture or horizontal posture can be discriminated by extracting the outline of the face. If the discrimination is made based only on the face, the upper and lower portions can be discriminated from the hair part and the face part. For the images of merchandise, there is a clear difference between the upper and lower image characteristics for skirts or pants, so that the upper and lower portions can be discriminated easily.

If the key items include "height," the height can be automatically measured to provide the height item based on the outline of the photographed image of the customer.

The image data may of course be compressed before being stored.

A second embodiment of this invention will be described below.

In the above-described first embodiment, a list of the retrieved images is displayed, the desired image is selected from among those images with the mouse and the selected image is individually displayed. If the presented list contains too many images, the individual images should inevitably become smaller, making it difficult to discriminate the contents of each image so that the user may have some difficulty in determining whether or not to select a certain image. In this respect, therefore, the first embodiment displays images in a 2×3 matrix. If the retrieval results in many associated images, the screen should be changed one after another until the desired image appears. To eliminate such a troublesome operation, it is apparently desirable that many images can be displayed at a time. The second embodiment is designed to display many images at a time while making the contents of each image easily discriminatable.

Figure 16:
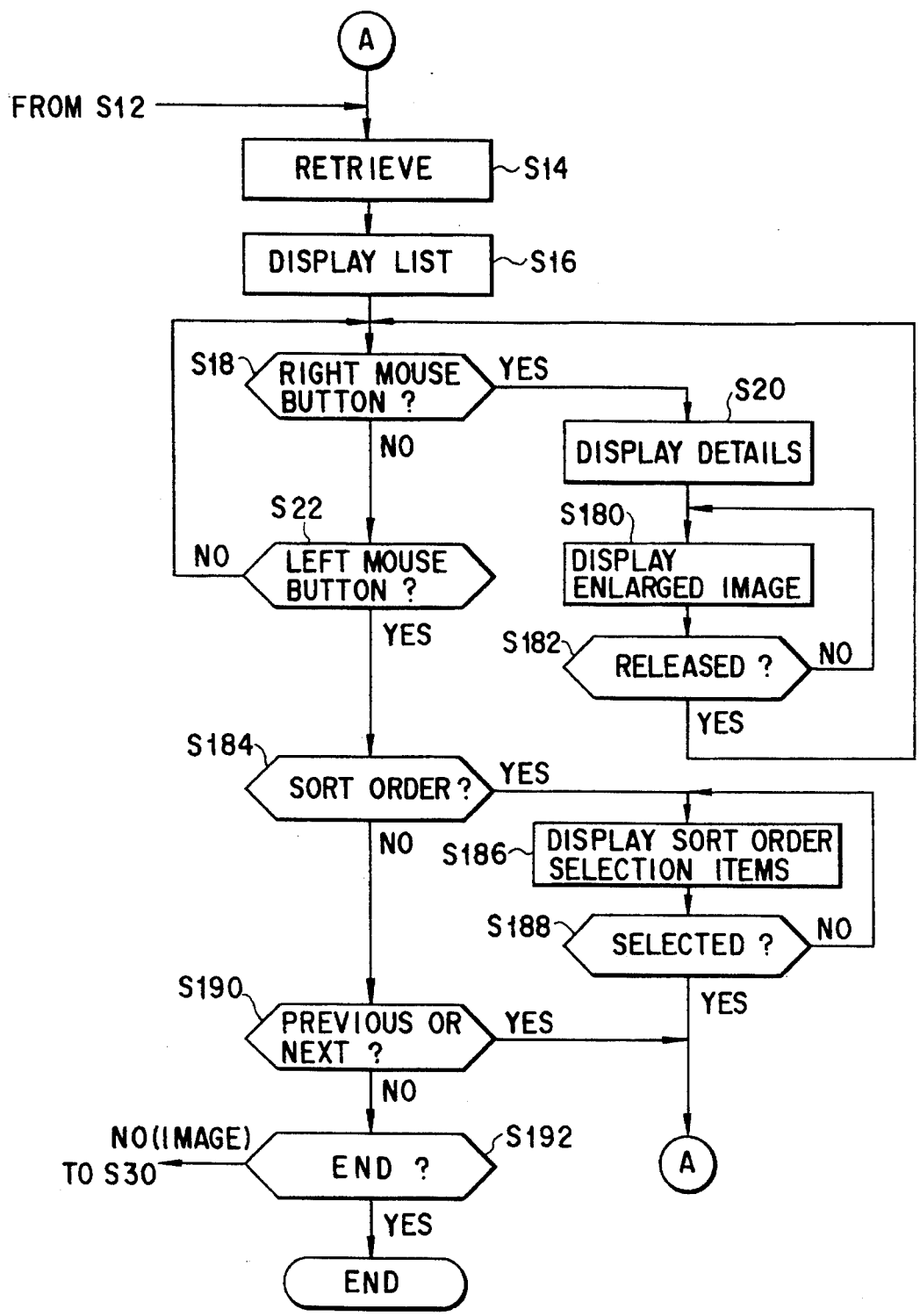
FIG. 16 is a flowchart illustrating a process concerning a list display portion in a retrieval process done by a processor according to a second embodiment of the present invention.
Figure 17:
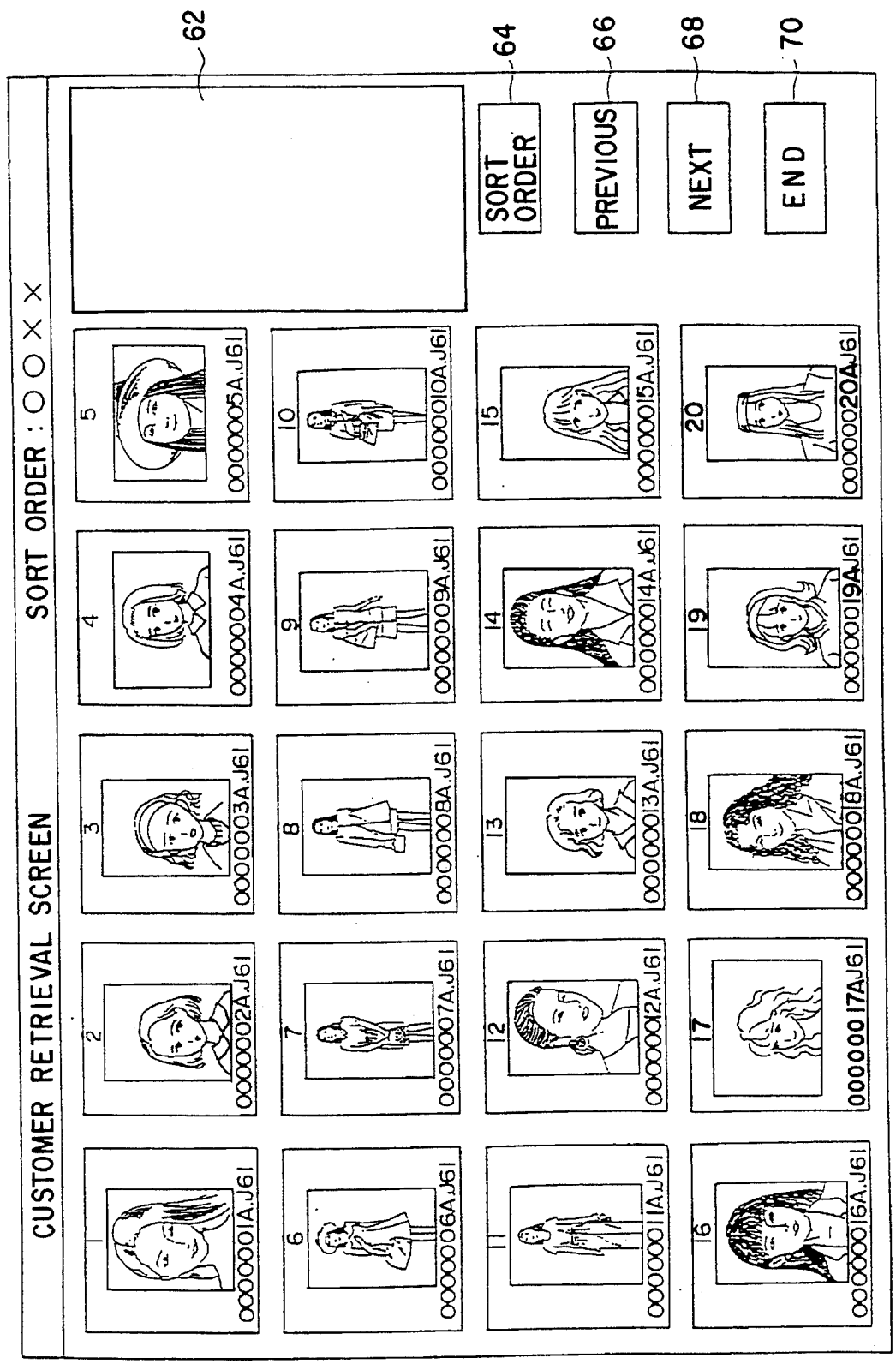
FIG. 17 is a diagram showing an image list display or an image list display screen.

FIG. 16 presents a flowchart illustrating a process about a list display portion in the retrieval process executed by the processor 20 according to the second embodiment. As already described with reference to the flowchart in FIG. 2, when a retrieval condition is input as needed through the instruction input section 40 to instruct retrieval of customers, the processor 20 selects a list display as one way of displaying the retrieval result, and enters the flowchart in FIG. 16. The processor 20 then searches the customer data storage section 24 in the data storage section 22 (step S14), and displays images and characters (customer data representative items) which match with the input retrieval condition, on the display 42 as a customer retrieval list display 50 (step S16) in the form of m×n images (5×4 images in this embodiment) as shown in FIG. 17. The image selection screen which displays a list of 5×4 images in a matrix form, each image displayed is small.

Figure 18:
FIG. 18 is a diagram showing a way to enlarge an image whose enlargement is specified in the image list display screen.

In some cases, it is difficult to determine whether or not an individual display of such a small image should be presented for further detailed information. In this case, the image can be enlarged for further details. When the operator moves the mouse cursor 40C to a target image and then keeps depressing the right mouse button on that image (step S18), detailed information about that image is read out from the key item section 24C and is displayed in a character data display area 62 (step S20), and the image is displayed in enlargement (step S180), as shown in FIG. 18. In this case, the image should be displayed in enlargement without overlapping adjoining images. Releasing the right mouse button (step S182) erases the enlarged display and returns the image display to the original status.

If the left mouse button is clicked (step S22), the processor 20 determines whether or not the mouse cursor 40C is pointing a "sort order" button 64 (step S184). If the mouse cursor 40C is pointing the "sort order" button, sort order items are displayed in the character data display area 62 (step S186) so that further selection by the mouse is possible. When the sort order is specified, the flow returns to the step S14 and retrieval and display are executed according to the specified sort order.

If it is not determined in the step S184 that the mouse is pointing the "sort order" button 64, it is then determined whether a "previous" button 66 or a "next" button 68 has been operated (step S190). If either button is operated, the flow returns to the step S14 to execute the retrieval and display of the previous or next 20 images specified by the button.

When it is not determined in the step S190 that the "previous" button 66 or "next" button 68 has not been operated, it is determined if an "end" button 70 has been operated (step S192). If this button 70 has been operated, the processor 20 terminates this retrieval process.

When it is not determined in the step S192 that the "end" button 70 has not been operated, the processor 20 considers that an image has been selected and goes to the step S30 to effect the individual display of the selected image.

Figure 19:
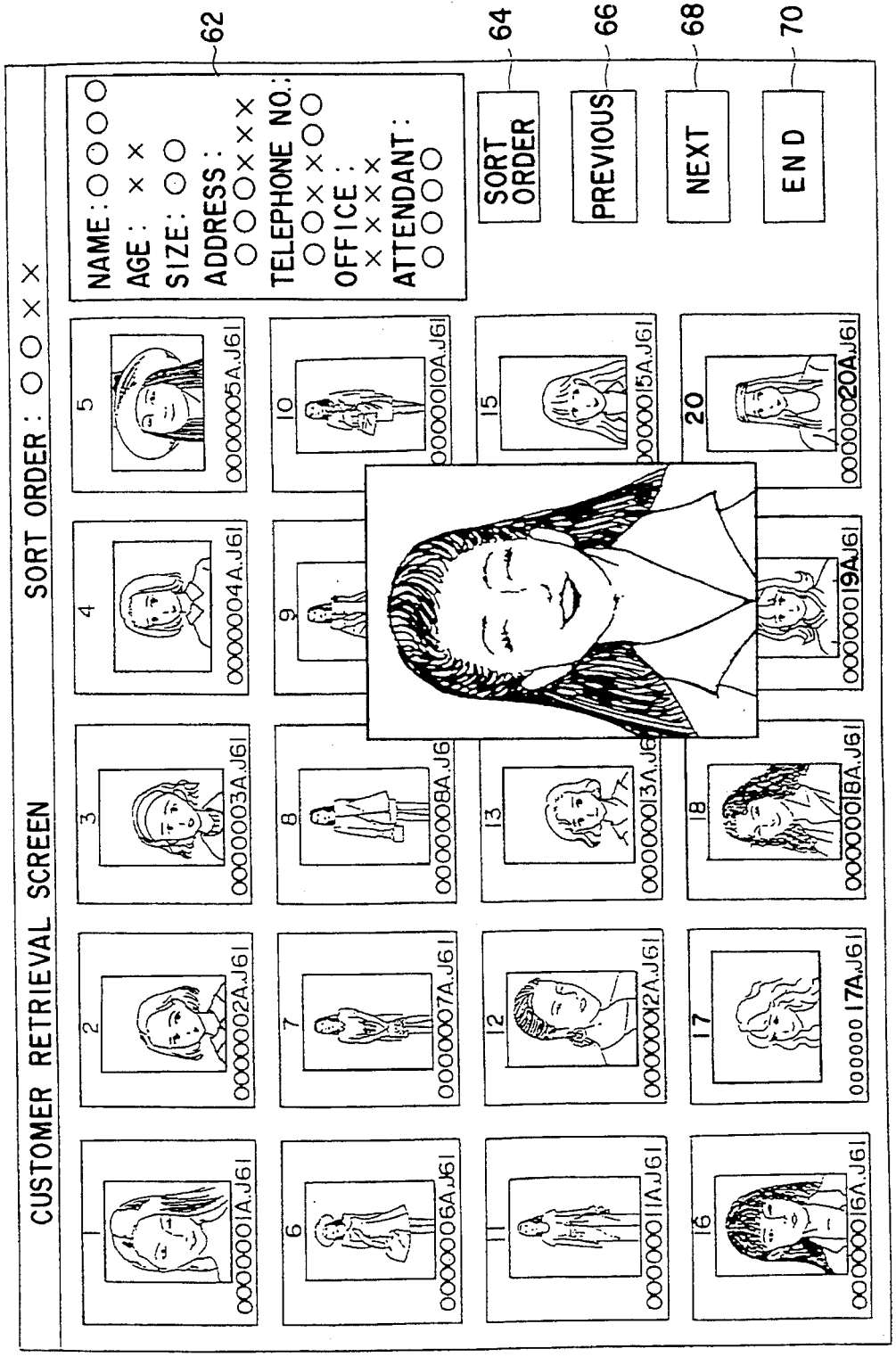
FIG. 19 is a diagram showing another way to enlarge an image whose enlargement is specified in the image list display screen.

In effecting the enlarged display in the step S180, the enlarged image display may be presented in such a way as to partially overlap the adjoining images as long as the adjoining images are not entirely hidden, as shown in FIG. 19.

The buttons of the mouse may be reversed.

In selecting an image to be processed from among many images listed in an m×n matrix form, each image is too small to make easier selection so that the image is selectively displayed in enlargement. At this time, the enlarged image display is effected in such a way that the image does not overlap the adjoining images or does not completely covers the adjoining images if partially overlapping them. That is, as each image can be enlarged without affecting the list of images, the image can easily be checked. Further, rough information about the enlarged image is displayed together with the enlarged image, it becomes easier to select the desired image.

Figure 20:
FIG. 20 is a diagram showing how to enlarge an image whose enlargement is specified in a purchase display.

The scheme of enlarging each image is applicable not only to the selection of an image to be individually displayed from among a list of images but also to various other cases. For instance, in the case of displaying a plurality of images side by side as in the purchase display as shown in FIG. 7, this enlarging scheme may be adapted to enlarge the image as shown in FIG. 20 to see the details of the desired image.

Figure 21A:
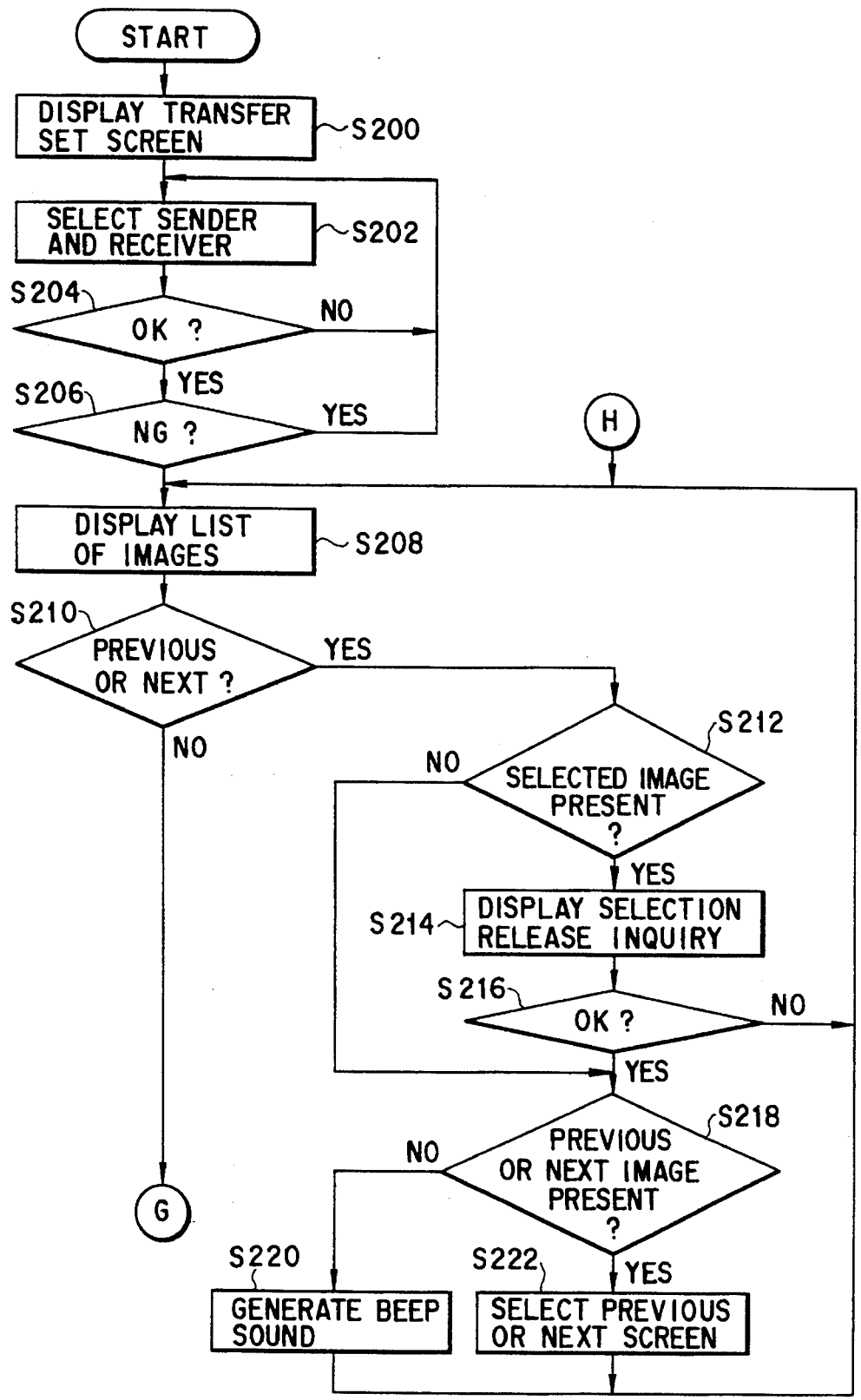
FIGS. 21A and 21B present a sequence of flowcharts for a process executed by the processor when the transfer of image data is instructed by an instruction input section.
Figure 21B:
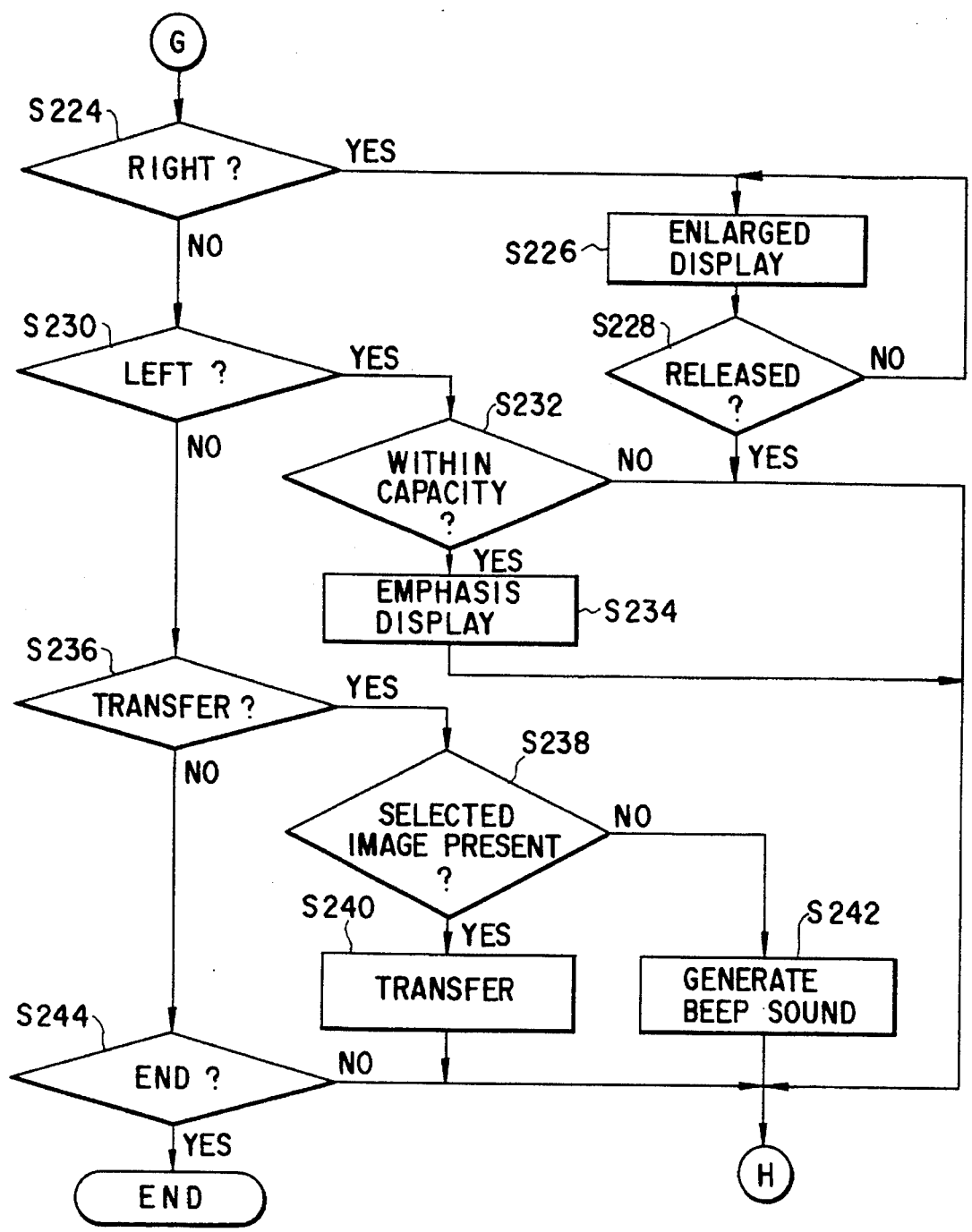

Alternatively, this method can be adapted for an operation to transfer an image file that is used for the backup purpose. This case will be described below with reference to FIGS. 21A and 21B which present a sequence of flowcharts for a process executed by the processor 20 when the transfer of image data is instructed by the instruction input section 40.

First, a transfer setting screen as shown in FIG. 22A for selecting the sender and receiver for image data to be transferred is displayed on the display 42 (step S200). Then, the unillustrated mouse of the instruction input section 40 is operated to select the sender and receiver for the image data to be transferred from among displayed icons 72, namely, a hard disk, MO, memory card and floppy disk (step S202).

When the left mouse button is clicked on the target icons 72, the icons 72 are emphasized in black frame as shown in FIG. 22B indicating that they have been selected. It should be noted that the sender and the receiver cannot be the same. Depending on the types of the selected sender and receiver, the image may be transferred from the sender to the receiver or the image may be copied. For instance, if the sender is a hard disk and the receiver is an MO, image data is transferred to the MO from the hard disk. Otherwise, the image data is copied to the receiver from the sender. When the image sender and the receiver are both selected, an arrow 74 at the center portion in the screen changes to black from gray, allowing the screen to change to the image selection screen.

By depressing an "OK" button 76 or moving the mouse cursor there and clicking the left mouse button (step S204), transfer setting is accomplished and the next image selection screen will be displayed. When either one of the image sender and the receiver or both are not selected, or when the same is selected for the sender and receiver, it is treated as NG (No Good) (step S206) so that even depressing the "OK" button 76 does not present the image selection screen.

When the transfer setting is completed, the image section screen showing a list of m×n (5×4 in this embodiment) images in a matrix form is displayed on the display 42 as shown in PIG. 23. This screen shows a hard disk selected as the image sender and an MO selected as the receiver. In this image section screen, image data is transferred by selecting an image to be transferred and depressing a "transfer" button 78. Above each image is an ID number for managing the image in the image data base and below the image is a file name of that image data. Displayed at the upper right of the screen are the free transfer memory capacity on the destination and the amount of selected image data. In this example, the free memory capacity on the receiver side is 97.1 Mbytes and the total size of currently selected image data is 0.0 Mbyte. Displayed on the lower right of the screen are four buttons, "transfer" button 78, "previous" button 80, "next" button 82 and "end" button 84.

When the "previous" button 80 or "next" button 82 is depressed (step S210), the screen changes to the previous or next image selection screen by one. In this case, however, if there are selected images (step S212), an inquiry is made to ask if the selection can be canceled and the screen can be changed (step S214). When aborting the cancellation is instructed, the flow returns to the step S208 to keep displaying the current image section screen. When there is no previous screen or next screen (step S218), a beep sound is simply generated (step S220) and the flow returns to the step S208 to keep displaying the current image section screen. If there is a screen to shift, on the other hand, the previous or next screen is selected (step S222) and the newly selected image section screen is displayed in the step S208.

Figure 23:
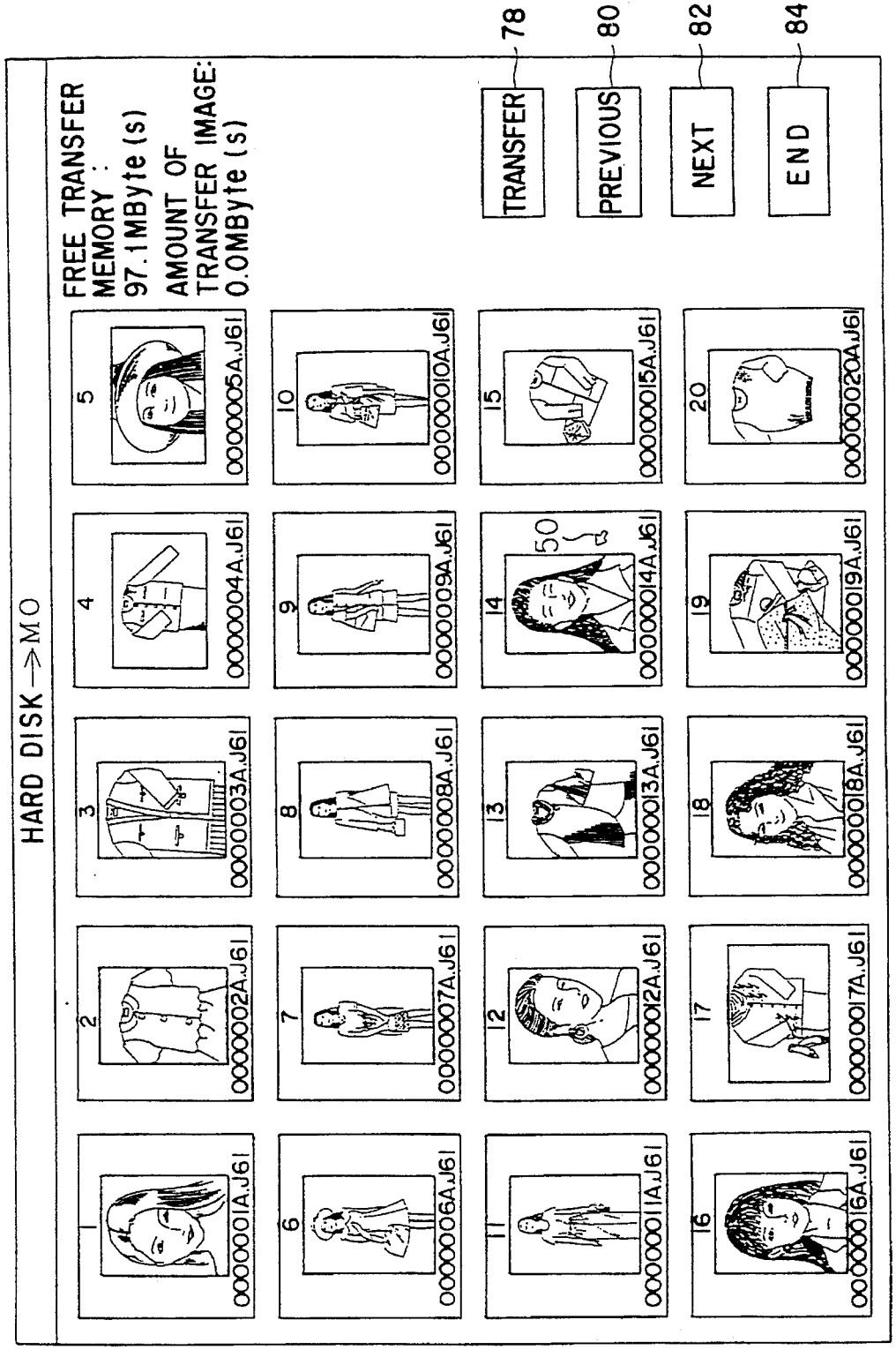
FIG. 23 is a diagram showing an image list display screen.
Figure 24:
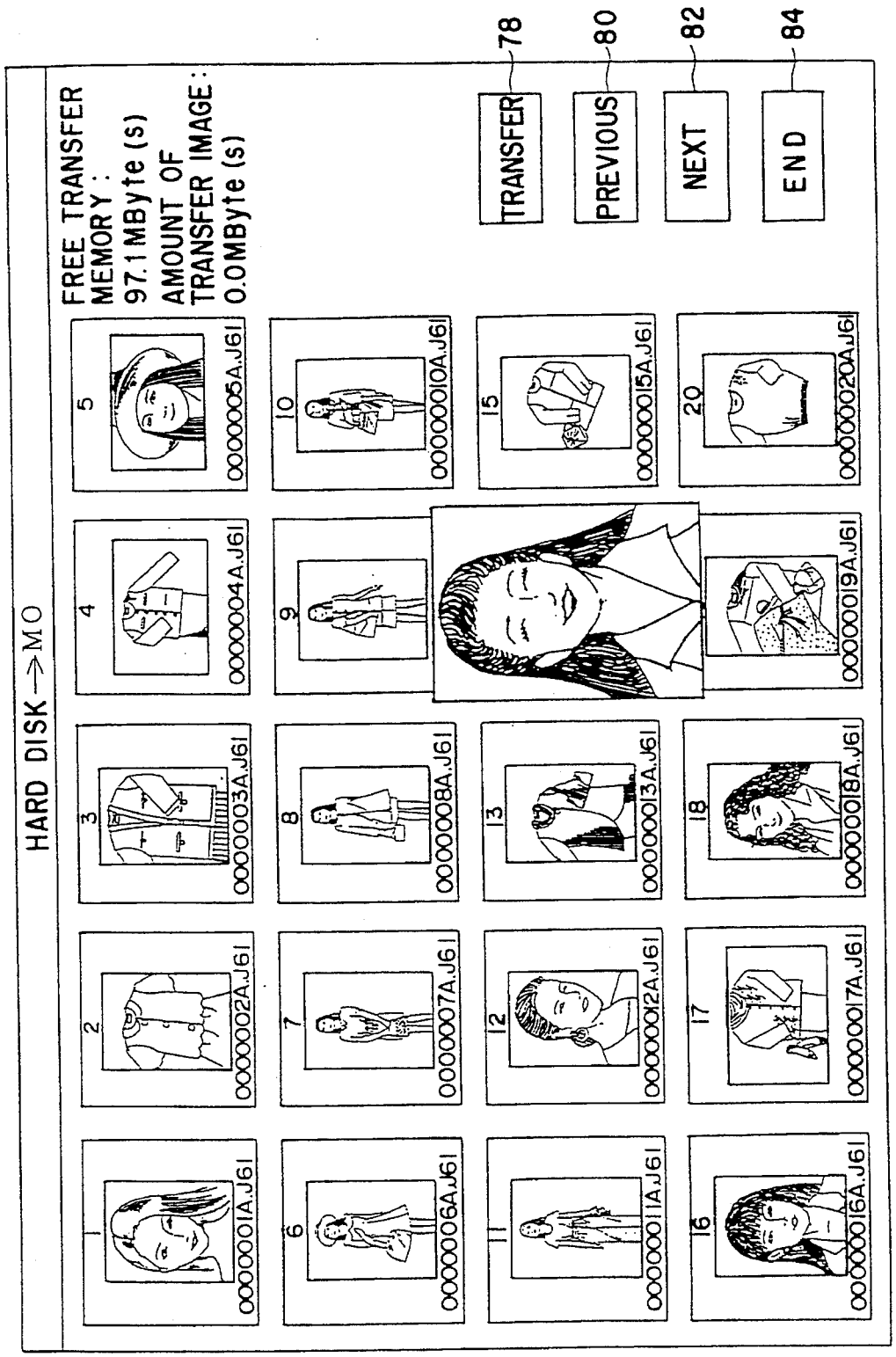
FIG. 24 is a diagram showing how to enlarge an image whose enlargement is specified in the image list display screen.

In the image section screen that shows a list of 5×4 or 20 images in a matrix form as shown in FIG. 23, each image is displayed small. With such a small image, the operator may have a difficult in determining whether or not the image is to be transferred. In such a case, the image may be enlarged to have more details. If the mouse cursor 40C is moved onto the desired image and the right mouse button is kept depressed on that image (step S224), the image is displayed in enlargement as shown in FIG. 24 (step S226). In this case, the enlarged display should be effected so that the image does not overlap the adjoining images. Releasing the right mouse button (step S228) erases the enlarged display and returns the image display to the original status.

To select an image to be transferred, the mouse cursor 40C is moved to the position of this image and the left mouse button is clicked there (step S230). The image selected by the clicking of the left mouse button is emphasized in red frame as shown in, for example, FIG. 25 so that it can be distinguished from any non-selected image (step S234). In accordance with the emphasis of the image, the amount of images to be transferred on the upper left of the screen is updated. When the amount of transfer images exceeds the free memory capacity on the destination side (step S232), no image selection is possible.

Figure 26:
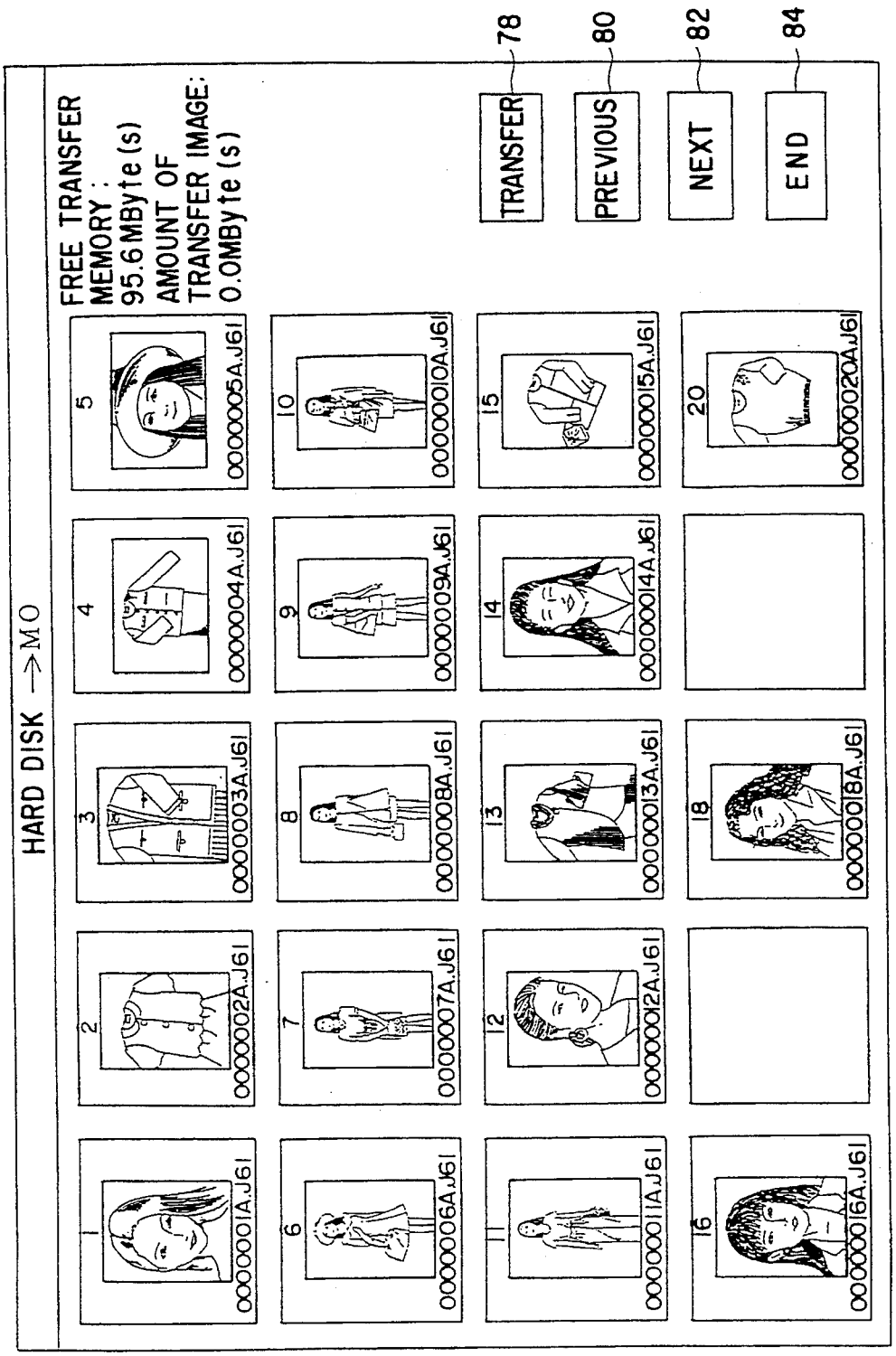
FIG. 26 is a diagram showing the list display screen after the selected images in FIG. 25 are transferred.
Figure 27:
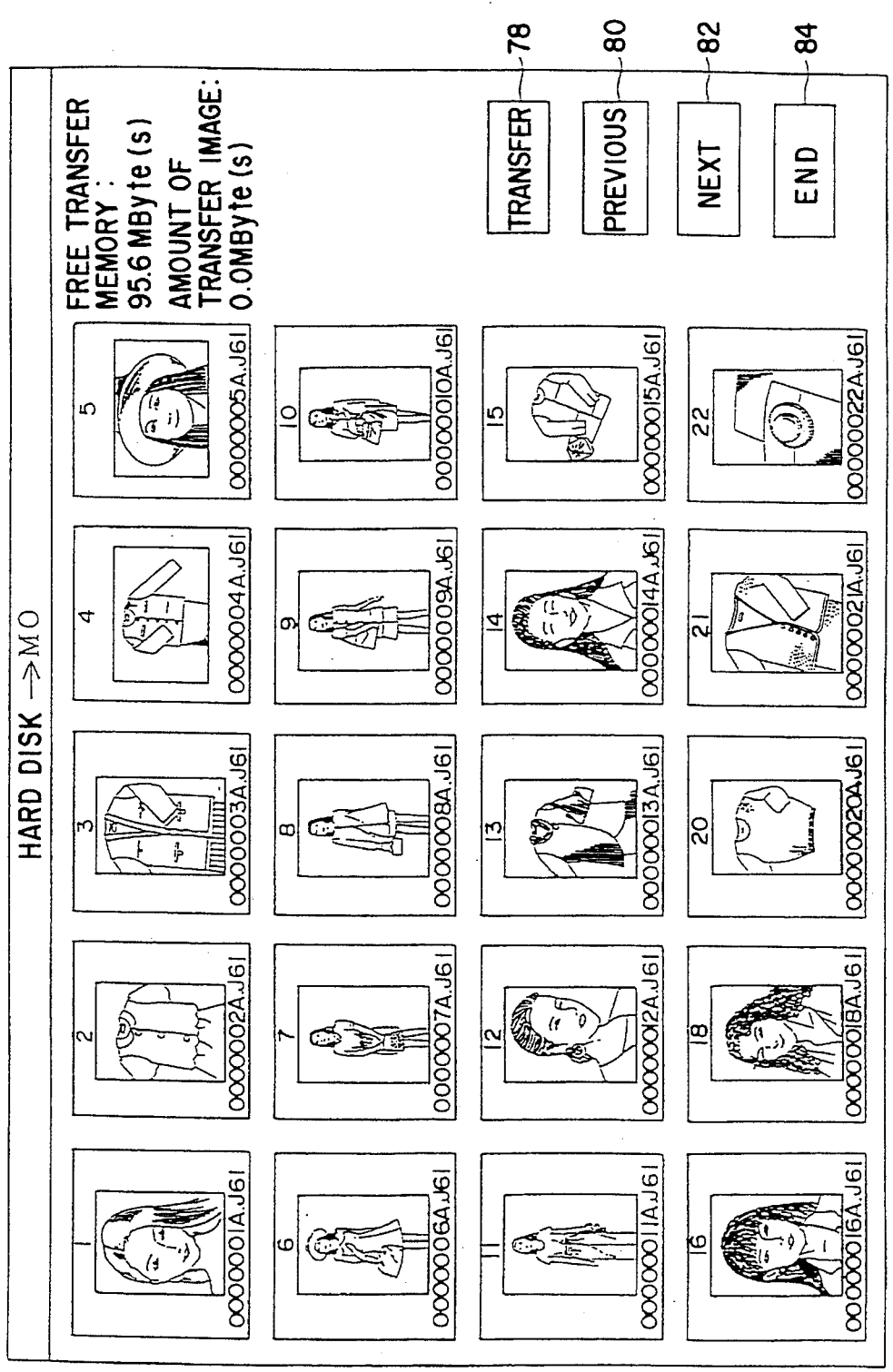
FIG. 27 is a diagram showing the list display screen after the screen in FIG. 26 is changed to the next or previous screen.
Figure 28:
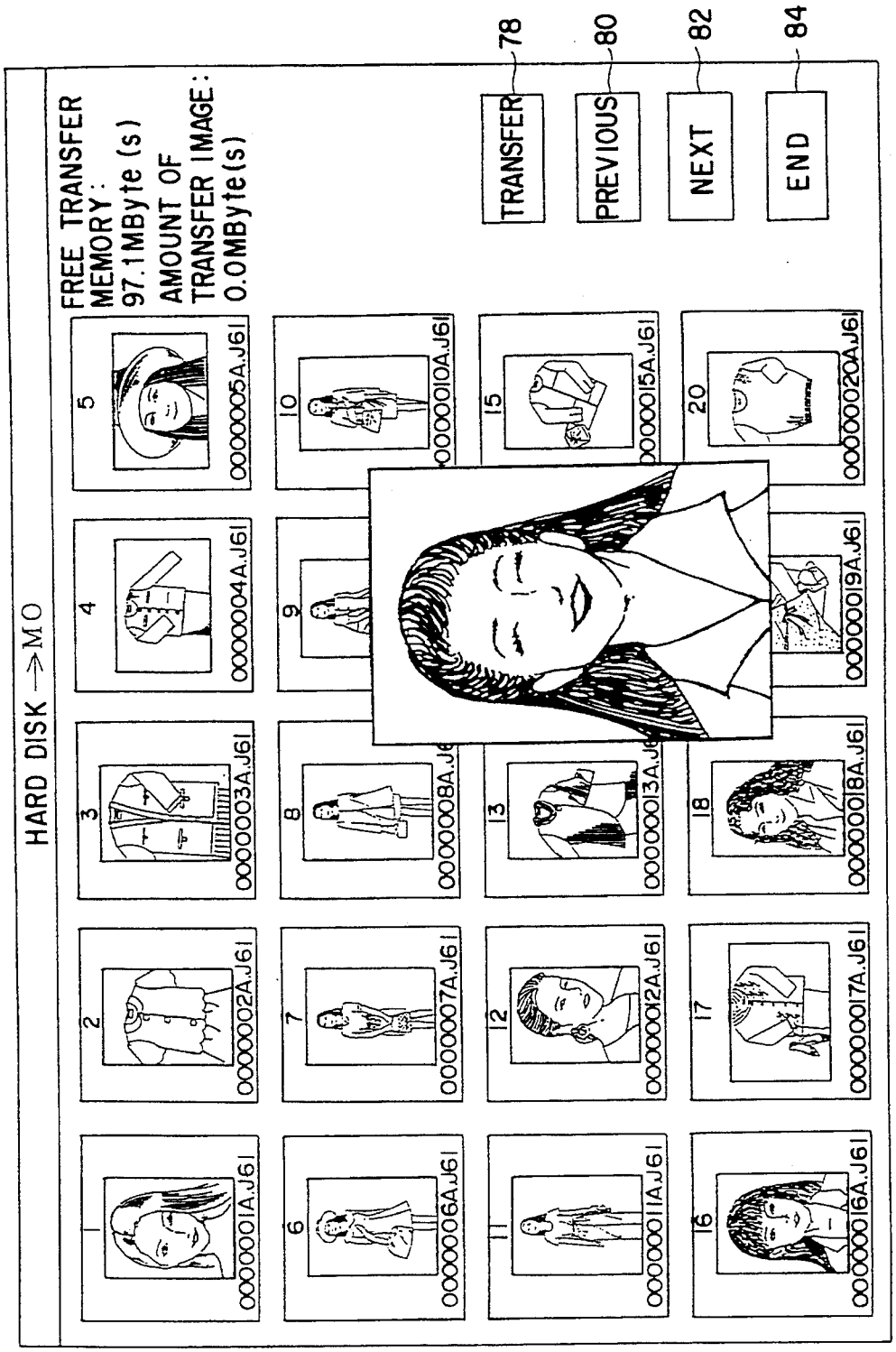
FIG. 28 is a diagram showing another way to enlarge an image whose enlargement is specified in the image list display screen.

When the "transfer" button 78 is depressed (step S236), the image data of a selected image, if there is any (step S238), is transferred (step S240). If this is the aforementioned case of image data copying, every time image data is transferred, the red-framed emphasis is released. If it is the case of image data transfer to an MO from a hard disk, however, the image data is transferred and gone from the hard disk, so that the image is not displayed as shown in FIG. 26. Thereafter, when the screen is changed to another screen and then changed back again, the image which has been transferred and does not exit in the hard disk 12 is moved over to eliminate blank space, as shown in FIG. 27.

When no image is selected (step S238), a beep sound is generated (step S242) and no image transfer is executed.

When the "end" button 84 is depressed (step S244), the transfer of this image is terminated.

In the enlarged display carried out in the step S226, the enlarged image display may be effected in such a way that the enlarged image partially overlaps the adjoining images as long as it does not completely covers the adjoining images.

Although this example has been explained with reference to the case where images are to be transferred, this example may also be adapted to selectively register data from plural pieces of image data, stored in the image input section 14 (memory card 12) or the external I/O unit 46 (CD-ROM, or the like), into the data storage section 22. Various operations can be carried out through the cursor keys, function keys, etc. on the keyboard without using the mouse. The CD-ROM drive, MO drive and FD drive may be installed in a personal computer. Further, this invention is applicable not only to an image data base system but also any system which handles images. This invention may of course be modified in various other forms or applied in various manners without departing from the scope or spirit of this invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image storage managing apparatus comprising:

customer data storage means for storing various types of customer information including customer image data relating to individual customers;

merchandise data storage means for storing various types of merchandise information including merchandise image data relating to individual items of merchandise;

sales data storage means for storing customer-merchandise link data for each individual customer, said customer-merchandise link data indicating individual items of merchandise purchased by said individual customer; and customer-merchandise retrieving means for retrieving customer information relating to a specific customer and merchandise information relating to individual items of merchandise purchased by said specific customer from said customer data storage means and said merchandise data storage means, respectively, based on said customer-merchandise link data stored in said sales data storage means, and for displaying said retrieved customer information and merchandise information, including respective customer image data and merchandise image data.

2. The apparatus according to claim 1, further comprising:

list display means for searching one of said customer data storage means and said merchandise data storage means, and for displaying a list of retrieved images side by side;

image selecting means for selecting one image from a plurality of images listed by said list display means; and enlarge display control means for enlarging said image selected by said image selecting means to a size such that said enlarged image does not completely cover any adjoining images, and for displaying said enlarged image.

3. The apparatus according to claim 2, wherein said enlarge display control means enlarges said selected image to a size such that said enlarged image does not overlap any adjoining images.

4. The apparatus according to claim 1, further comprising:

image selecting means for selecting one image from a plurality of images displayed by said customer-merchandise retrieving means; and enlarge display control means for enlarging said image selected by said image selecting means to a size such that said enlarged image does not completely cover any adjoining images, and for displaying said enlarged image.

5. The apparatus according to claim 4, wherein said enlarge display control means enlarges said selected image to a size such that said enlarged image does not overlap any adjoining images.

6. The apparatus according to claim 1, wherein, for each individual item of merchandise, said sales data storage means stores merchandise-customer link data indicating customers who purchased said individual item of merchandise, and wherein said apparatus further comprises:

merchandise-customer retrieval means for retrieving merchandise information relating to a specific individual item of merchandise and customer information relating to individual customers who purchased said specific individual item of merchandise from said merchandise data storage means and said customer data storage means, respectively, based on said merchandise-customer link data stored in said sales data storage means, and for displaying said retrieved merchandise information and customer information, including respective merchandise image data and customer image data.

7. The apparatus according to claim 6, further comprising:

list display means for searching one of said customer data storage means and said merchandise data storage means and for displaying a list of retrieved images side by side;

image selecting means for selecting one image from a plurality of images listed by said list display means; and enlarge display control means for enlarging said image selected by said image selecting means to a size such that said enlarged image does not completely cover any adjoining images, and for displaying said enlarged image.

8. The apparatus according to claim 7, wherein said enlarge display control means enlarges said selected image up to a size such that said enlarged image does not overlap any adjoining images.

9. The apparatus according to claim 6, further comprising:

image selecting means for selecting one image from a plurality of images displayed by said customer-merchandise retrieving means; and enlarge display control means for enlarging said image selected by said image selecting means to a size such that said enlarged image does not completely cover any adjoining images, and for displaying said enlarged image.

10. The apparatus according to claim 9, wherein said enlarge display control means enlarges said selected image up to a size such that said enlarged image does not overlap any adjoining images.

11. An image storage managing method comprising the steps of:

storing various types of customer information including customer image data relating to individual customers in a customer data storage means;

storing various types of merchandise information including merchandise image data relating to individual items of merchandise in a merchandise data storage means;

storing customer-merchandise link data for each individual customer in a sales data storage means, said customer-merchandise link data indicating individual items of merchandise purchased by said individual customer;

retrieving customer information relating to a specific customer and merchandise information relating to individual items of merchandise purchased by said specific customer from said customer data storage means and said merchandise data storage means, respectively, based on said customer-merchandise link data stored in said sales data storage means; and displaying said retrieved customer information and merchandise information including respective customer image data and merchandise image data.

12. The method according to claim 11, further comprising the steps of:

searching one of said customer data storage means and said merchandise data storage means;

displaying a list of retrieved images side by side;

selecting one image from said list of images;

enlarging said selected image to a size such that said enlarged image does not completely cover any adjoining images; and displaying said enlarged image.

13. The method according to claim 12, wherein said selected image is enlarged and displayed such that said enlarged image does not overlap any adjoining images.

14. The method according to claim 11, further comprising the steps of:

selecting one image from a plurality of images retrieved and displayed; and enlarging said selected image to a size such that said enlarged image does not completely cover any adjoining images; and displaying said enlarged image.

15. The method according to claim 14, wherein said selected image is enlarged and displayed such that said enlarged image does not overlap any adjoining images.

16. The method according to claim 11, further comprising the steps of:

storing merchandise-customer link data for each individual item of merchandise in said sales data storage means, said merchandise-customer link data indicating customers who purchased said individual item of merchandise; and retrieving merchandise information relating to a specific individual item of merchandise and customer information relating to individual customers who purchased said specific individual item of merchandise from said merchandise data storage means and said customer data storage means, respectively, based on said merchandise-customer link data stored in said sales data storage means; and displaying said retrieved merchandise information and customer information, including respective merchandise image data and customer image data.

17. The method according to claim 16, further comprising the steps of:

searching one of said customer data storage means and said merchandise data storage means and displaying a list of retrieved images side by side;

selecting one image from said list of images;

enlarging said selected image to a size such that said enlarged image does not completely cover any adjoining images; and displaying said enlarged image.

18. The method according to claim 17, wherein said selected image is enlarged and displayed such that said enlarged image does not overlap any adjoining images.

19. The method according to claim 16, further comprising the steps of:

selecting one image from a plurality of images retrieved and displayed; and enlarging said selected image to a size such that said enlarged image does not completely cover any adjoining images; and displaying said enlarged image.

20. The method according to claim 19, wherein said selected image is enlarged and displayed such that said enlarged image does not overlap any adjoining images.

21. The apparatus according to claim 1, further comprising:

image producing means for producing customer image data corresponding to images of individual customers; and image input means for inputting the produced customer image data to said customer data storage means.

22. The apparatus according to claim 21, further comprising:

image input means for inputting merchandise image data relating to individual items of merchandise to said merchandise storage means.

23. The method according to claim 11, further comprising the steps of:

producing customer image data corresponding to images of individual customers; and inputting the produced customer image data to said customer data storage means.

24. The method according to claim 23, further comprising the step of:

image input means for inputting merchandise image data relating to individual items of merchandise to said merchandise storage means.

* * * * *